United States Patent [19]
Deal, Jr.

[11] 4,355,388
[45] Oct. 19, 1982

[54] MICROPROGRAMMABLE TDMA TERMINAL CONTROLLER

[75] Inventor: Joseph H. Deal, Jr., Clarksburg, Md.

[73] Assignee: Communications Satellite Corporation, Washington, D.C.

[21] Appl. No.: 79,619

[22] Filed: Sep. 27, 1979

[51] Int. Cl.³ ............................ H04J 3/04; H04J 3/06
[52] U.S. Cl. .................................... 370/104; 370/80; 370/95
[58] Field of Search .................... 370/104, 80, 79, 95, 370/112, 113; 455/12

[56] References Cited
U.S. PATENT DOCUMENTS

| | | | |
|---|---|---|---|
| 3,641,274 | 2/1972 | Sasaki | 370/104 |
| 3,689,699 | 9/1972 | Brenig | 370/105 |
| 3,754,102 | 8/1973 | Clark | 370/105 |
| 3,816,666 | 6/1974 | Tomozawa | 370/104 |
| 4,032,719 | 6/1977 | Blasbalg | 370/80 |

Primary Examiner—David L. Stewart
Attorney, Agent, or Firm—Sughrue, Mion, Zinn, Macpeak & Seas

[57] ABSTRACT

A microprogrammable TDMA terminal controller is of modular construction. Frame reference and burst synchronization timing are resolved to the symbol level by a split frame counter, and a control RAM is reprogrammable "on-the-fly" to permit easy changes in terminal traffic assignments. The terminal controller includes a microprogrammed RAM controller for performing real time burst and data path control functions, transmit and receive high-speed data path modules for interfacing with the modem and terrestrial interface ports and providing direct burst processing of the data, a microcomputer-based operation control and a high stability oscillator.

32 Claims, 34 Drawing Figures

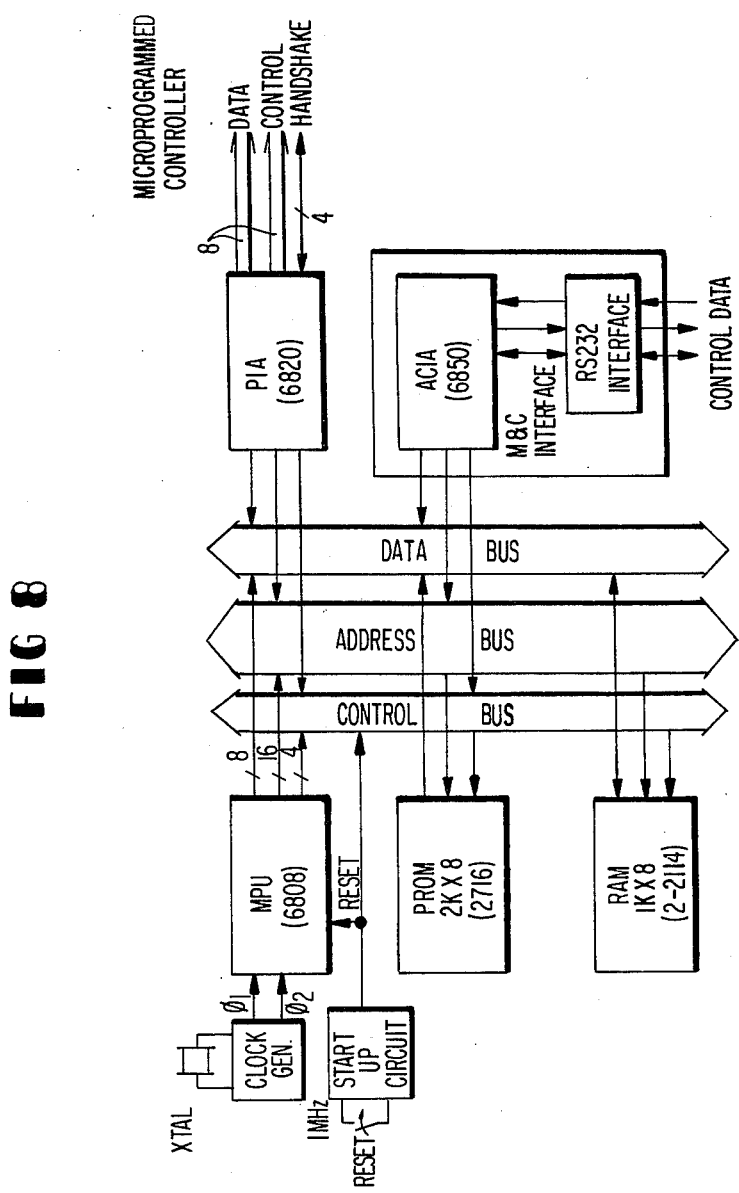

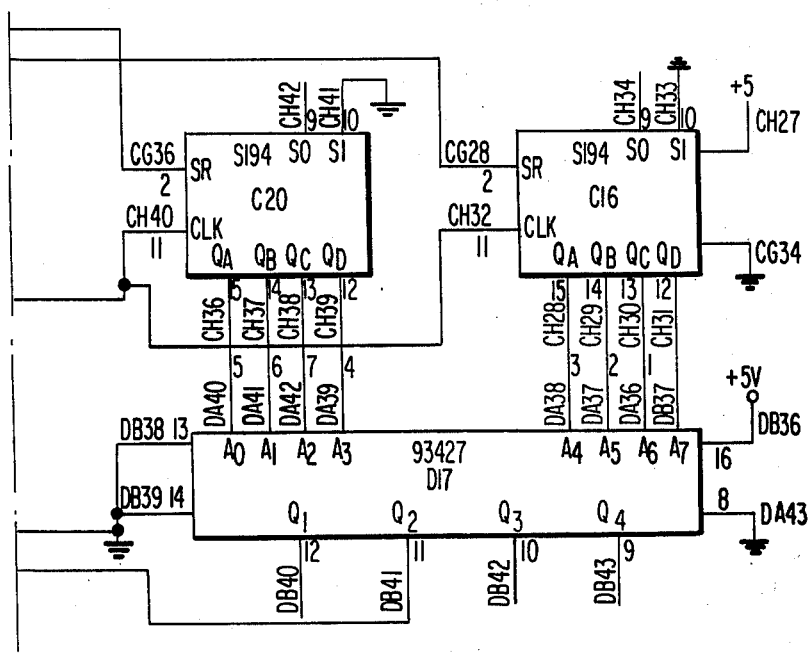
FIG IIb
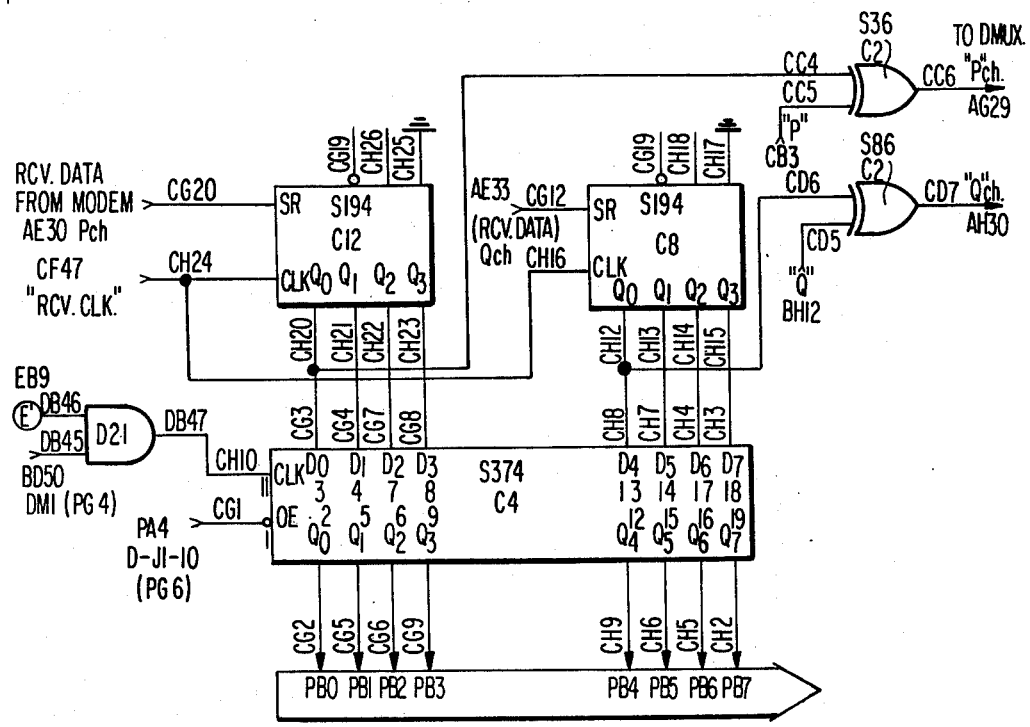
FIG IIc
| FIG IIa | FIG IIb |

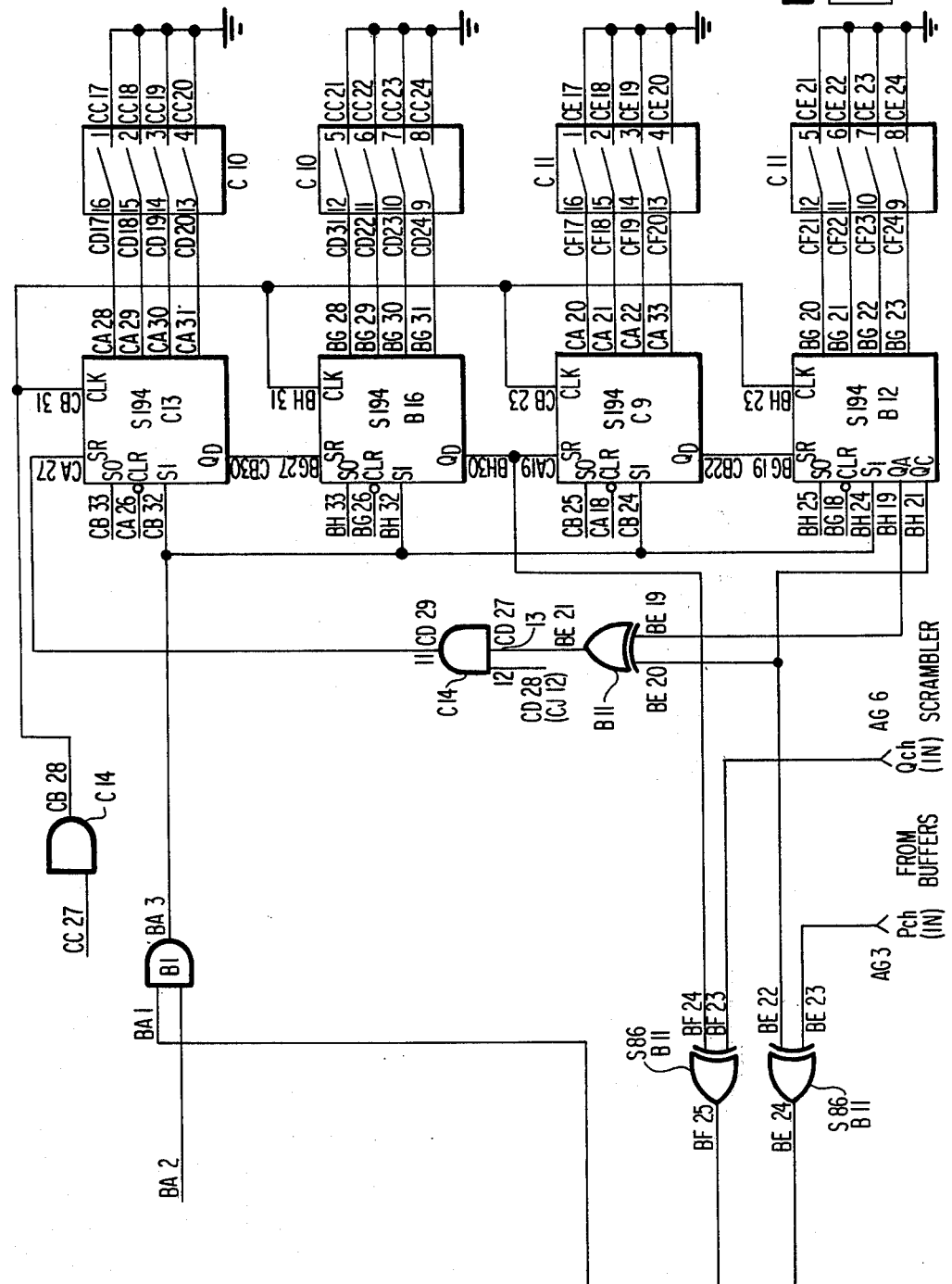

DATA TO MODEM

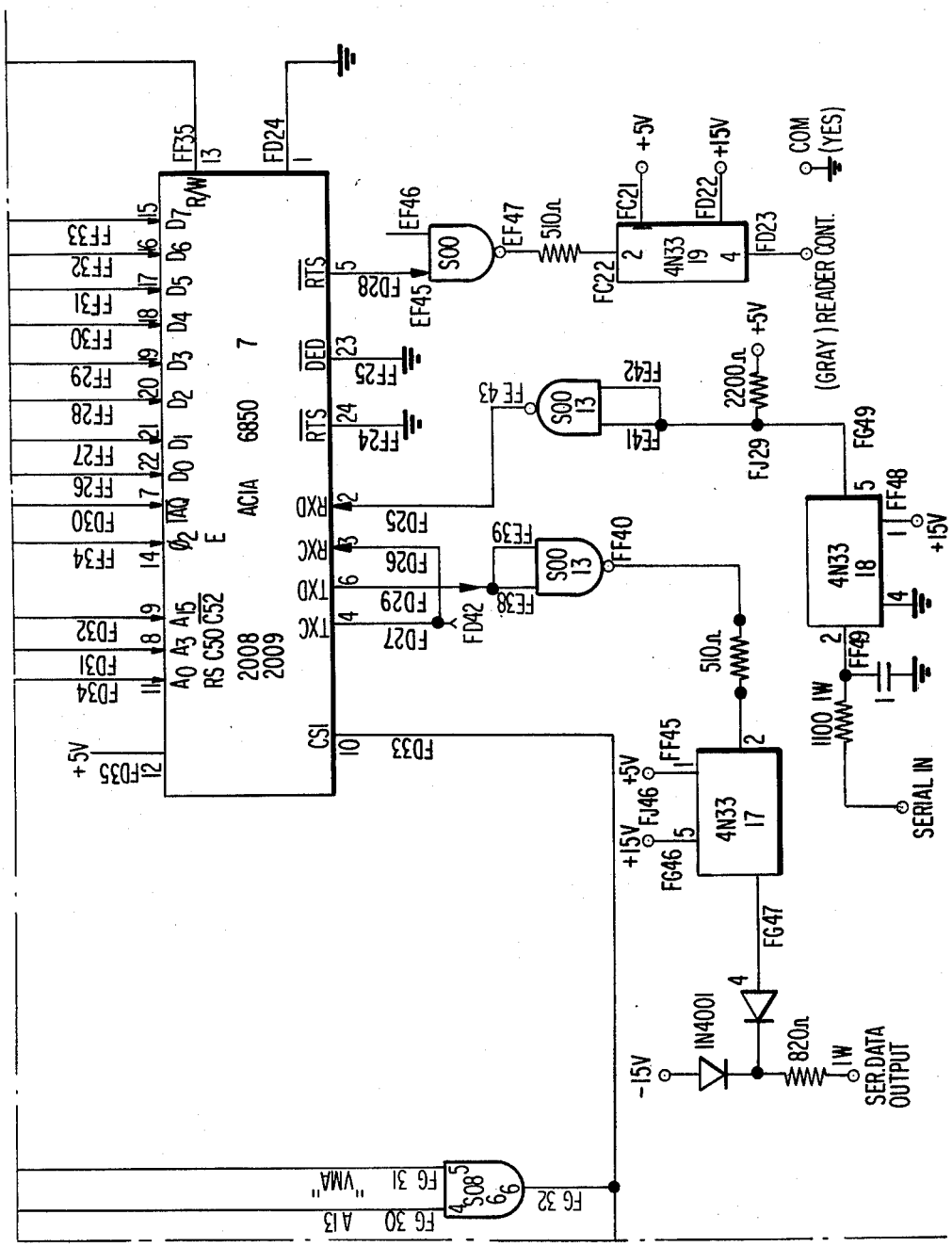

MICROPROGRAMMABLE TDMA TERMINAL CONTROLLER

BACKGROUND OF THE INVENTION

In Time Division Multiple Access (TDMA) transmission, the satellite transponder is used or accessed by a number of earth stations in an ordered time sequence. The transmissions are timed such that the Phase Shift Keyed (PSK) modulated RF carriers of the same frequency arrive at the satellite without overlap. The primary advantages of the TDMA method for commercial satellite communications are the efficient utilization of the satellite power and frequency spectrum and the flexibility provided in reconfiguring the TDMA burst and traffic patterns.

In general, a TDMA terminal must perform two basic functions. First, the terminal must form a burst from a number of continuous stream of data and transmit this data with a preamble at a specified time such that the transmitter burst does not interfere with any other burst transmission. Second, the terminal must receive burst transmissions intended for the terminal, recover the continuous data streams from the received bursts and route the data to the correct terrestrial interface module (TIM).

Accordingly, in the transmit mode of operation, the terminal must typically send read address signals to TIM ports, receive corresponding data from the addressed ports and prepare the data for TDMA transmission in a burst format. Depending on the desired burst size, the data is divided into blocks, and to each block of data is added a preamble containing carrier and bit timing acquisition symbols, origin code information, range data, order wire information, etc. The burst formed by the data block and the preamble is then scrambled and sent to the modulation equipment for modulation onto a carrier and subsequent transmission.

In the receive mode of operation, the demodulated bursts are received from the modulation and demodulation equipment (MODEM) and essentially the reverse processing is accomplished so that continuous data and corresponding write address signals can be sent to the proper TIM ports.

As described above, modulated carriers of the same frequency must arrive at the satellite transponder without overlap. Accordingly, participating stations in a TDMA system may be allocated certain burst positions within a TDMA frame, and each station must time its transmissions such that its burst will arrive at the satellite during the proper interval of the TDMA frame. In order to accomplish this, a source of common frame referenced timing is required and each station must synchronize its burst transmissions to this common frame reference timing based on satellite range information.

One method of establishing a common frame reference is for one burst in the TDMA frame to be used as the reference. In previous TDMA terminal equipment designs such as disclosed in Contribution of BG/T, *System Specification of the INTELSAT Prototype TDMA System*, BG-1-18E, Mar. 20, 1974, one earth station is required to act as the reference station and transmit a special reference burst at a fixed position in the TDMA frame. As a result of this rigid arrangement, reference burst replacement, in the event of reference station failure, is a complex process involving the exchange of special messages between a number of stations in the network.

In conventional TDMA systems, such as described in *Design Plan for INTELSAT Prototype TDMA Terminal Equipment*, presented by Nippon Electric Company, Limited, Tokyo, Japan at the Fourth Digital Satellite Conference in July of 1976, control over the configuration of the burst, the number of bursts in a frame and the corresponding control of the multiplexer and demultiplexer operation is implemented using random hardware logic configurations. This leads to undesirable circuit costs and complexity.

Still further, conventional TDMA terminal equipment has required a separate burst multiplexer/demultiplexer to control the terrestrial interface ports. See, for example, the above-referenced BG/T publication in addition to O. G. Gabbard, "Design of a Satellite Time-Division Multiple Access Burst Synchronization", IEEE Transactions of Communications Technology, Vol. COM-16, number 4, August 1968, pages 589–596; or W. G. Maillet, "Processing of the INTELSAT-/IEEE International Conference on Digital Satellite Communications", November 1969, pages 69–80. This use of a separate multiplexer/demultiplexer has resulted in an undesirable increase in the cost and complexity of conventional terminal equipment.

It would be desirable to utilize a microprogrammed controller for TDMA terminal control in order to overcome the above-mentioned difficulties. However, a disadvantage of conventional microprogrammed controllers used in digital computer systems is their lack of accurate resolution in timing control. Conventional systems have utilized microprogrammed controllers such as disclosed by J. L. Nichols, "A Logical Next Step for ROM", *Electronics*, June 1967, pp. 111–113; K. J. Thurber, R. O. Berg, "Universal Logic Modules Implemented Using LSI Memory Techniques" *Fall Joint Computer Conference Proceedings*, November 1971, pp. 177–194; or Signetic Corporation, *Digital/Linear MOS Applications Handbook*, 1974, pp. 24–47. Each of these designs has been primarily intended for use in digital computers where the emphasis is placed on control rate rather than control resolution. Accordingly, such microprogrammed controllers would not operate satisfactorily in a TDMA system.

SUMMARY OF THE INVENTION

Accordingly, it is an object of this invention to simplify the TDMA terminal control hardware and provide improved resolution in TDMA timing control.

It is a further object of this invention to provide dynamic reprogramming capability which permits on-line reconfiguration of transmit and receive bursts without the necessity of separate control RAMs operated in "ping-pong" fashion.

It is a further object of this invention to provide a TDMA terminal using an improved technique for deriving frame reference timing so that reference burst replacement is greatly simplified.

It is a still further object of this invention to provide a TDMA terminal capable of performing a number of different methods of transmit burst synchronization.

It is a further object of this invention to eliminate the necessity of a separate burst multiplexer/demultiplexer for controlling the TIM ports.

Briefly, these and other objects are realized according to the present invention by a microprogrammed TDMA terminal controller which is a flexible, low cost, high speed, digital logic system for performing TDMA terminal functions. These functions include TDMA burst transmission synchronization, generation and detection of TDMA burst preambles, and the controls and interfacing necessary for multiplexing and demultiplexing the TDMA burst data.

The microprogrammed TDMA terminal controller according to the present invention essentially comprises a microprogrammed RAM controller which performs the real time terminal burst and data path control functions, transmit and receive high-speed data path modules which directly interface with the terestrial interface ports and modem and provide direct burst processing of the data, microcomputer-based operation control which provides local and/or remote terminal Monitor and Control (M&C) and performs calculations and utility functions as required for terminal operation and, finally, a high stability oscillator which operates at the symbol rate and from which the transmit side symbol timing and local frame timing are derived.

The microprogrammed RAM controller uses a random access memory (RAM) and memory address counters to generate the terminal controls. The RAM controller includes a "split" frame symbol counter which is divided into fine and coarse counter sections. The coarse counter comprising the most significant bits of the split frame symbol counter serves as the control RAM address counter to determine the coarse interval during which the timing controls are to be provided. A fine symbol counter comprising the least significant bits of the split frame symbol counter selects the time of occurrence of the control pulses within that coarse interval. Since the fine symbol counter operates at the symbol rate, resolution of the timing control can be accomplished at the symbol level.

Dynamic reprogramming of the control RAM "on-the-fly" is permitted by a new pipeline control structure and selective RAM write operation and allows a single microprogrammed RAM controller to simultaneously perform the controls necessary for both the transmit and receive sides. The burst assignments can be reconfigured on-line, without interruption of traffic transmissions.

Sequencing the terrestrial interface ports (TIPs) is performed directly from the common controller so that the requirement for a separate burst multiplexer and demultiplexer is eliminated.

BRIEF DESCRIPTION OF THE DRAWINGS

The present invention will be more clearly understood by reference to the following description in conjunction with the accompanying drawings in which:

FIG. 8 is a brief block diagram of the operation control microcomputer and the monitor and control (M&C) interface;

FIGS. 11a and 11b are a schematic diagram of the unique word detector included within the receive data path module;

FIG. 11c is a schematic diagram of the data latch included within the receive data path module;

FIGS. 14a and 14b are schematic diagrams of the preamble generator and scrambler, respectively, included within the transmit data path module;

FIGS. 21a–21d are more detailed schematic diagrams of the operation control microcomputer and monitor and control interface of FIG. 8;

DETAILED DESCRIPTION OF THE INVENTION

Figure 1:
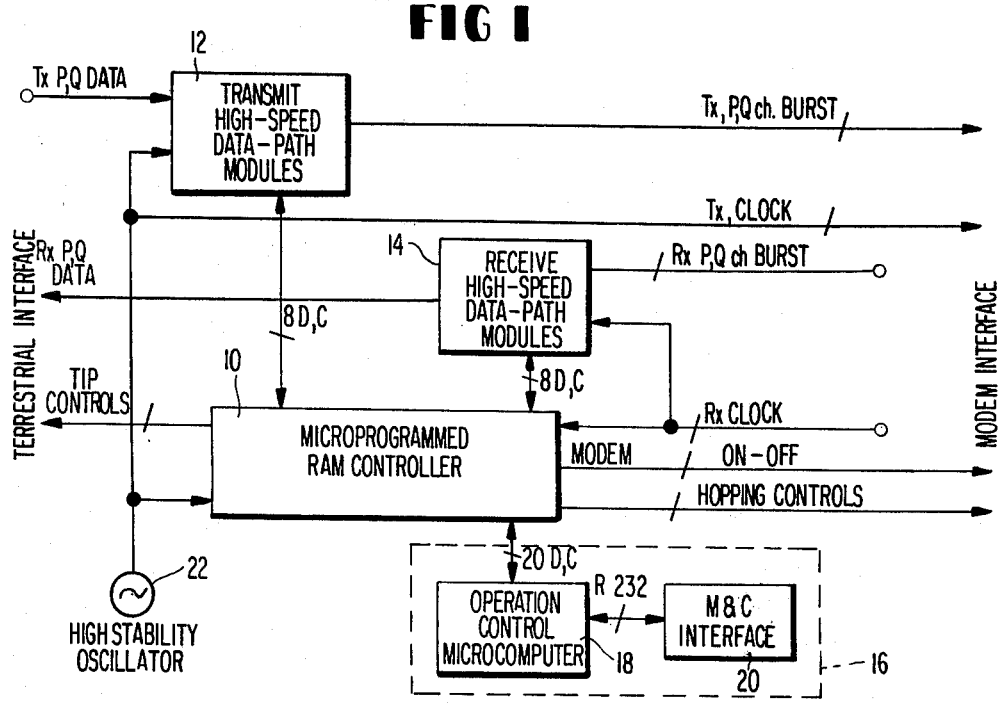
FIG. 1 is a block diagram illustrating the major sub systems of the microprogrammed TDMA terminal controller according to the present invention.

The terminal controller is shown in FIG. 1 connected to the terrestrial interface ports (TIPs) on the terrestrial side and the QPSK modem on the satellite side. The RF portions of the TDMA earth station equipment including the up-and down-converters, high power amplifier, low noise amplifier and antenna subsystems, are not considered part of the TDMA terminal and are not controlled. An exception to this occurs in frequency or transponder hopping, where the terminal activates the hopping switch.

As shown in FIG. 1, the terminal controller of the present invention essentially comprises a microprogrammed RAM controller 10 which performs the real time terminal burst and data path control functions, transmit and receive high-speed data path modules 12 and 14, respectively, which directly interface with the TIPs and modem and provide direct burst processing of the data, a microcomputer-based operation control 16, which includes both a microcomputer 18 and a monitor and control (M&C) interface 20 and performs calculations and utility functions as required for terminal operation and, finally, a high stability oscillator 22 which operates at the symbol rate and from which the transmit side symbol timing and local frame timing are derived.

Typically, the high stability oscillator comprises a high quality temperature-controlled crystal oscillator having a long term accuracy of approximately $10^{-7}$ per year and a short term accuracy of approximately $10^{-9}$ per 300 msec.

Figure 2:
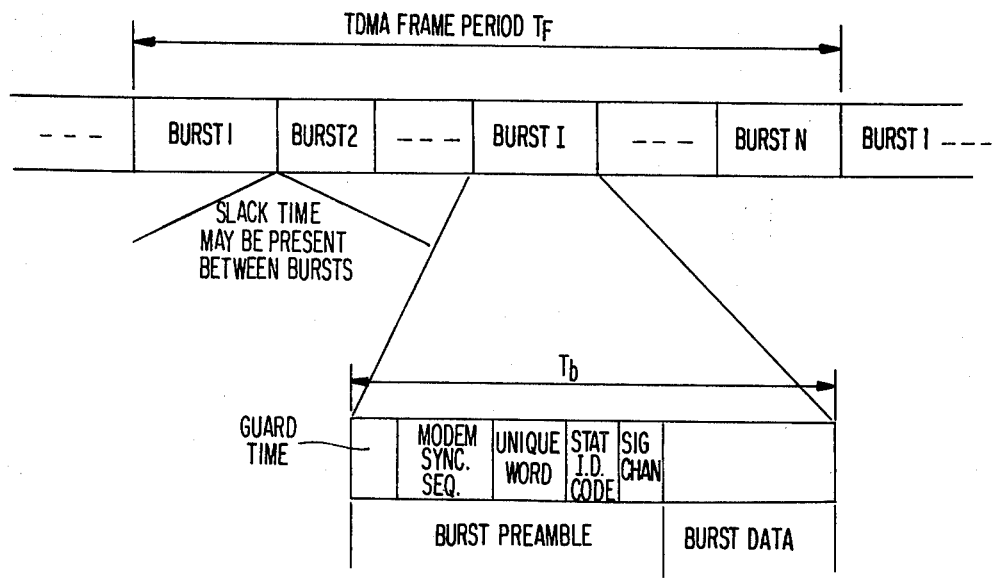
FIG. 2 is an illustration of the typical TDMA frame and burst structures.

A typical TDMA frame and burst structure is shown in FIG. 2. TDMA transmissions are divided into frame periods $T_F$ each of which includes N bursts. Each burst includes a block of burst data preceeded by a burst preamble. The preamble includes a station identification code, signaling channel information and a modem synchronization sequence containing carrier and digital timing acquisition symbols, range data and order wire information. The preamble also includes a unique word. The unique word may uniquely identify each terminal but, as will become more clear, this would require a large number of unique word detectors at each TDMA terminal. Thus, it is preferable to have the same unique word for all terminals, or to have a different unique word only for the reference station.

In the system illustrated in FIG. 1, the controller 10 will address the terrestrial interface ports each of which, in response to the proper address signal, will send to the transmit module 12 a stream of P and Q channel data. The transmit module 12, under the control of the controller 10, will receive the P and Q channel transmission data, generate the preamble and send the burst to the modem with the properly synchronized timing. The receive module 14 will receive demodulated bursts from the modem, separate the P and Q channel information from the preamble and provide the received data to the terrestrial interface. The controller 10 will send to the terrestrial interface the corresponding port control signal which are derived from the preamble.

In addition to providing the port control signal to the terrestrial interface, the microprogrammed RAM controller 10 must provide timing control and, therefore, receives a clock signal derived from the demodulated receive bursts. The controller 10 also controls the on and off times of the modem as well as the transponder hopping.

Figure 3:
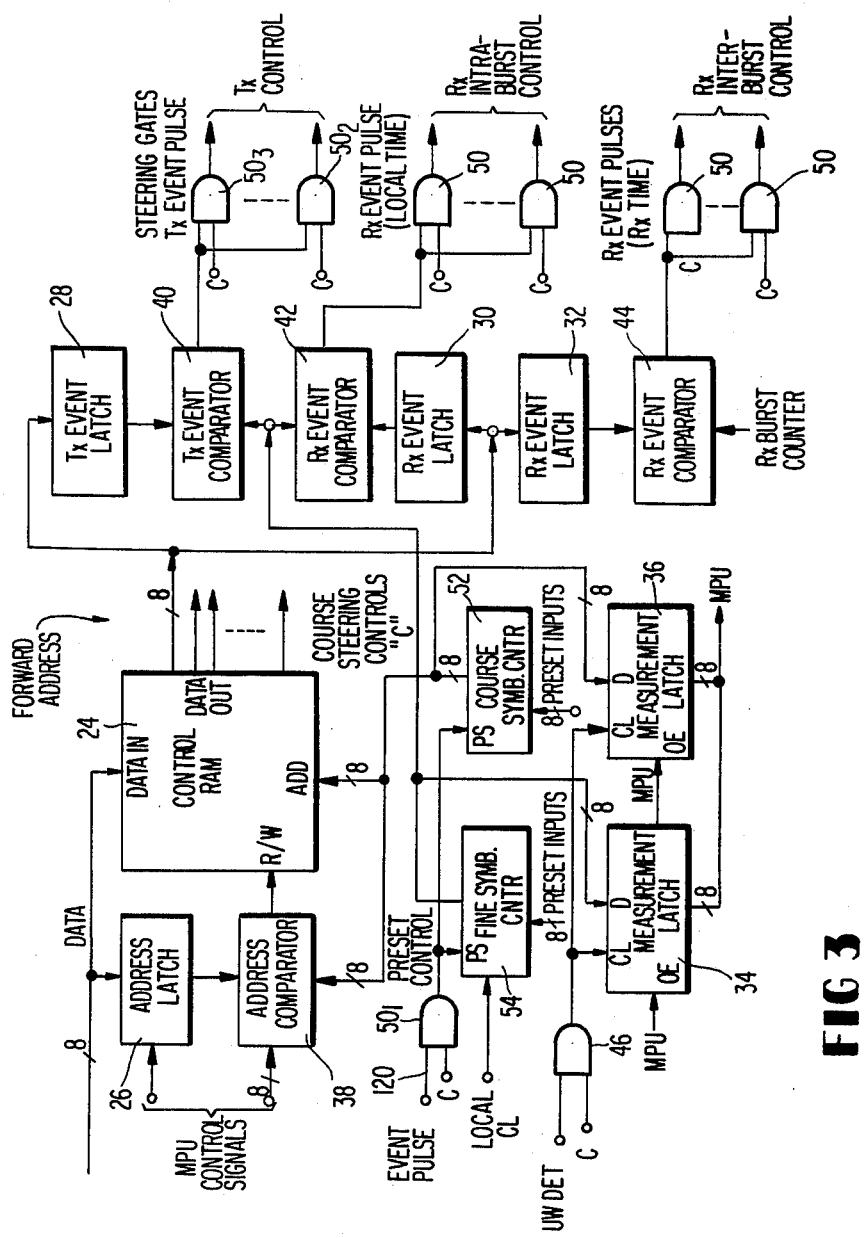
FIG. 3 is a block diagram of the microprogrammed RAM controller shown in FIG. 2.

Shown in FIG. 3 is a block diagram of the microprogrammed RAM controller 10 of FIG. 1. The controller includes a control RAM 24, latches 26, 28, 30, 32, 34 and 36 comparators 38, 40, 42 and 44. Also included are AND gate 46 and steering AND gates 50; and a "split" frame symbol counter comprising a coarse symbol counter 52 and a fine symbol counter 54.

Timing control is accomplished by the RAM controller as follows. As described above, each burst within a TDMA frame includes a unique word. When each local terminal properly maintains burst transmission timing, all of the received bursts, at any terminal, are positioned within the TDMA frame such that the unique word in each burst falls within a predetermined time aperture. This aperture is typically 7 symbols wide ±3 symbols centered on the nominal receive position. Since the TDMA signal received by each terminal also includes that terminal's own burst, the terminal can monitor its own unique word position within each frame to determine if its timing is proper.

Figure 4:
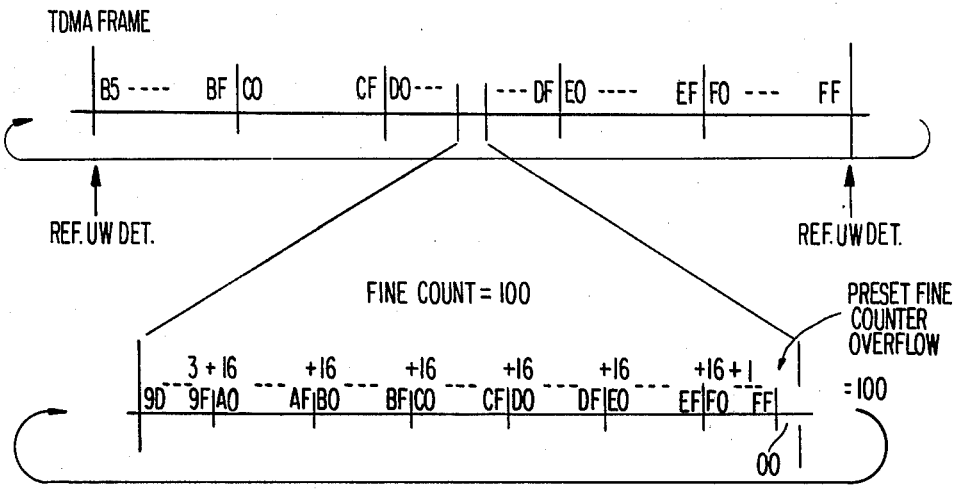
FIG. 4 is an illustration of the coarse and fine count intervals for an example of 7500 symbols per frame.

The split frame counter can be used to provide accurate monitoring of the unique word position. Each of the coarse counter 52 and fine counter 54 can be implemented in the base line design as separate 8-bit synchronous, pre-set, binary counters (e.g., each may be a pair of Fairchild 93S16-4bit synchronous counters). By synchronously presetting these counters once during each TDMA frame and clocking the fine counter 54 at the symbol rate, single symbol resolution is possible for frame lengths up to the capacity of the combined 16-bit counter. A course and fine resolution frame counting sequence is shown in FIG. 4 for a 125 msec frame and 60 Msym/sec symbol rate.

In order to get a local station on the air, the position of the reference burst with respect to the frame counter must first be determined by an initial acquisition procedure. This is so because the local frame counter is allowed to free run because of TTl counter specifications on the reset. First, a coarse address corresponding to a full frame count is loaded into the latch 26 and a corresponding fine address loaded into the control RAM 24. A few coarse counts before the coarse address is reached, the fine address is loaded into the latch 30. When the coarse symbol counter 52 arrives at the selected coarse address, a coarse steering control signal from the RAM 24 enables the gate $50_1$. As soon as the fine address is reached by the fine symbol counter 54, the comparator 42 will provide an output pulse on line 120 and the gate $50_1$ will preset the counters 52 and 54 to the values determined by their preset inputs. An alternate steering control output of the RAM 24 will enable gate 46. When the unique word is detected, the gate 46 will clock the latches 34 and 36 which, in turn, will store the counter values from counters 54 and 52, respectively. The microcomputer reads the latches and compares the recorded position with the assigned position for the reference burst unique word and can either apply the appropriate corrections to the preset inputs to the counters 52 and 54 so that the reference burst unique word is properly positioned, to within one symbol accuracy, within the local TDMA frame or the corrections can be accomplished by reprogramming the RAM to cause the local frame period to increase or decrease and move the estimate of local frame timing with respect to the actual frame reference. This relative motion will continue until the time of occurrence of the local and reference frames are aligned.

If a different unique word and unique word detector are provided for the reference burst, the output from the reference unique word detector will indicate to the microprocessor the exact position of the reference burst, and the microprocessor will program the RAM to achieve proper frame reference timing.

If the same unique word and identical unique word detector are used for all stations, the next unique word detected after enablement of the unique word detector may not be the reference burst unique word. The microprocessor will reprogram the RAM under the assumption that it has detected the reference burst unique word, and it will examine the station identification code immediately following the unique word. If this identification code is that of the reference burst, frame reference timing is achieved. If not, the microprocessor then reprograms the coarse and fine counts in the RAM so as to shift the unique word detection aperture to the following burst. This process is repeated until the reference station identification code is detected, and the frame reference timing is then complete.

The frame counter preset pulse, rather than being controlled by an event pulse, could be provided directly from the output of the unique word detector and gated by the TAM controller. In such a case, suitable circuitry would have to be provided to ensure that the counter would be preset at the proper frame symbol count and "fly wheel" in the event of unique word misdetection. For example, the gate $50_1$ could be replaced with an OR gate receiving one input from the unique word detector. The other input to the OR gate would be provided from a conventional flywheel timer clocked by the carryover output signal from coarse counter 52.

Having thus found the position of the reference burst, the terminal controller can achieve transmit burst synchronization in any one of the loopback, feedback or open-loop methods. The loopback method is described in the above-referenced Gabbard publication and the feedback method is described by D. Lombard, G. Payet, H. Herr, "The TDMA System and Test Program for Field Trial Via Symphonic", *Digital Satellite Conference Record*, November 1972, pp. 1–13. The open-loop method is described by A. Jefferis and K. Hodson, "New Synchronization Scheme for Communications Satellite, TDMA System", *Electronic Letters*, November 1973, Vol. 9, No. 24. In all of these methods, the frame reference time can be derived from a reference burst located in any arbitrary frame position, and reference burst switchover to a burst in another frame position can be easily accomplished if required without reorganization of the TDMA burst assignments.

Using the loopback method of synchronizaton, the terminal controller initially receives an estimate of the proper local burst transmission timing from an initial acquisition unit such as described by H. Kurihara, A. Ogawa, Y. Hirata, "A New Initial Acquisition Technique for TCM-TDMA Satellite Communication System", *Proceedings of the Third International Conference on Digital Satellite Communications*, November 1975, pages 288–292. Alternatively, the terminal controller may receive an estimate base on the expected satellite position for open-loop acquisition. In either case, the initial estimate of the local burst transmission timing is typically accurate to within $\pm 4$ $\mu$sec.

Using this initial estimate of local burst transmission timing, the local terminal controller causes the transmission of a preamble-only burst near the center of the assigned burst slot. The precise timing of this preamble-only burst is determined by coarse and fine counts stored in the control RAM 24. When the corase symbol counter 52 arrives at the stored coarse count, the gate $50_3$ is enabled, and the transmit enable pulse will be provided whenever the comparator 40 detects a correspondence between the value in fine symbol counter 54 and a value which has been loaded into latch 28 from RAM 24.

Following a time delay of approximately 1 round trip propagation to the satellite, the terminal controller enables the unique word detection aperture centered on the assigned local loopback burst position and aproximately $\pm 4$ $\mu$sec in width. This enabling of the unique word detector is accomplished by providing an enabling pulse to the gate $50_3$ from the control RAM 24 in response to a particular coarse count in the symbol counter 52, and by loading into the latch 30 from the control RAM 24 a fine count value corresponding to the precise desired enabling time of the unique word detector. The detection aperture is typically 7 symbols wide, $\pm 3$ symbols centered on the nominal receive position.

When the unique word detector is enabled, the gate 46 is also enabled, so that an output pulse is provided by the gate 46 when the unique word of the local terminal is detected. The precise measured position of the unique word is then stored in latches 34 and 36 and compared with the desired unique word position in the microprocessor. In response to an error between the measured and desired position, the microprocessor will change the coarse and fine addresses in the control RAM 24 for determining the timing of the transmission event pulse. Transmission timing error is corrected by "fly-by" reprogramming of the control RAM locations which effect the transmit burst position. This fly-by reprogramming is performed by the latch 26 and comparator 38 under the control of the microprocessor.

In steady-state burst synchronization, measurement of the burst transmission timing error is performed approximately once every round trip propagation delay to the satellite, and the measurement is averaged over a number of frames, typically five. The transmission timing error correction is implemented in steps of whole numbers of symbols at a maximum rate of one symbol step correction per TDMA frame.

The feedback method of transmit burst time synchronization is intended for use with spot beam operation where a local loopback signal is not available. This method of synchronization is performed with the assistace of a cooperating station which measures the timing error associated with the received burst, i.e., the difference between the actual measured received burst position and the assigned position. The measured error is then transmitted back to the local station via the signaling channel station via the signaling channel in a burst preamble, and the local transmit burst timing is corrected according to the error information sent back by the cooperating station. Error detection or error correction coding should be provided in order to protect the burst control information and prevent erroneous data from causing a burst transmission timing error and possible burst interference. The major difference between the loopback and feedback methods of transmit burst synchronization is the additional satellite propagation and delay associated with the feedback method. Since the result of a transmit burst timing correction cannot be determined faster than the round trip propagation delay, the measurement interval for the feedback method is twice that required for the loopback method.

In the open-loop method of transmit burst timing synchronization, the transmit burst timing is provided by an external source which may, for example, be a microcomputer with access to satellite positional data and a real-time clock. Depending upon the data accuracy and resolution, additional processing and interpolation of the data may be necessary. In addition, since the transmission timing accuracy is reduced in the open-loop method, the TDMA terminal controller can provide for larger guard time and unique word detection apertures in order to compensate for this reduced timing accuracy.

The coarse resolution controls (coarse steering controls) gate the occurrence of transmit and receive events within a coarse interval. The event pulses are generated by performing the logic "AND" operation between the coarse controls and the fine resolution control pulses generated at the output of the comparators. The time of occurrence of the event pulse within a coarse count interval is determined by the "Forward" address loaded into the comparator latch by eight separate outputs of the control RAM. These fine-count forward addresses representing the desired frame symbol location of the particular control or event pulse, are loaded into the event latches one or more coarse count intervals prior to the desired time of occurrence of the output event pulse. In the base line microcontroller design, the control RAM is implemented using 4 256×4 Schottky TTL LSI chip (Fairchild 93S422). The number of RAM coarse control outputs can easily be expanded in this design by adding additional RAM chips and associated steering gates.

It is noted that three separate sets of event latches and comparators are provided, one each for the independent control of the transmit timing and the local and distant receive timing. Independent control is necessary in TDMA synchronization due to the satellite motion which causes the receive and transmit blocks to vary asynchronously. Local terminal receive and transmit event time can crossover and overlap in normal TDMA operations.

The intra-burst receive side timing control provided by the output from comparator 42 and used primarily for generating unique word detection apertures is based on the local clock, and the inter-burst receive side timing control provided by the output of comparator 44 and used for controlling the burst demultiplexing is based on the receive symbol clock. Alternatively, the inter-burst receive side control can be generated by the intra-burst event pulses and the separate inter-burst control can be eliminated if the receive "P" and "Q" data paths are retimed to the local symbol clock prior to the terminal processing.

The coarse and fine resolution timing controls are synchronized by clocking the coarse controls with the fine resolution counter overflow. This synchronization is critical to the circuit operation and care must be exercised to insure that the phase of the coarse control exactly coincides with the rising and trailing boundaries of the fine count. A while number of symbols offset in timing, i.e., the fine count not starting at 0 in the coarse count interval, can be compensated for as part of the processing performed by the microcomputer. However, a timing offset of a fraction of a symbol can generate multiple outputs of the fine count edge boundaries and result in incorrect operation of the hardware. The synchronization of the coarse and fine resolution timing control restores the operation of the split frame counter to the equivalent timing resolution provided by a fully synchronous TDMA frame counter.

Since the RAM address input is controlled directly by the coarse counter, writing into a specific RAM location, e.g., to change the transmit burst timing, is accomplished by using the "fly-by" reprogramming technique by entering the address desired to be reprogrammed into the latch 26 while presenting the new data to the RAM inputs. When the coarse counter reaches the desired address, reprogramming will automatically occur. The control previously stored in the RAM is pipelined in the baseline design to allow reprogramming without interruption of active control. A compare operation between the coarse counter output and the address in latch 26 will initiate the RAM write operation and signal to the microcomputer by using a special interface control line, that the RAM write operation is complete.

Figure 5:
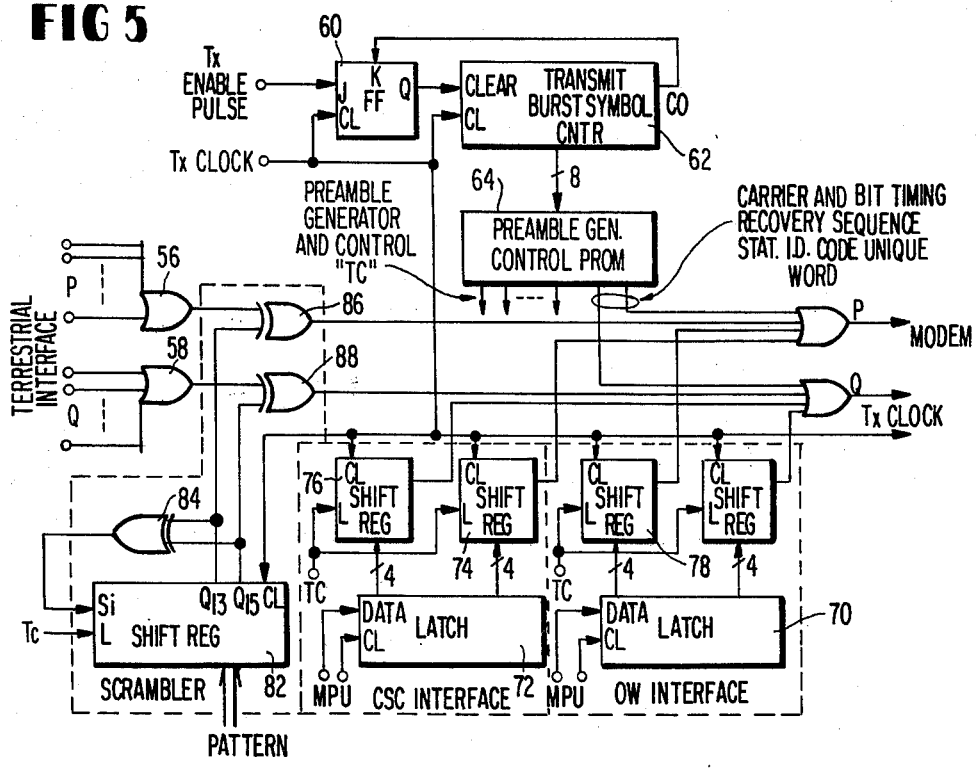
FIG. 5 is a block diagram of the transmit high-speed data path module shown in FIG. 1.

FIG. 5 is a block diagram of the components of the transmit high-speed data path module. In response to polling address signals sent by the RAM controller 10 to the terrestrial interface ports, the OR gate 56 and 58 receive the P and Q data respectively, from the selected ports. The flip flop 60 and counter 62 form a resettable transmit burst symbol counter which is clocked by the high stability oscillator 22 and is enabled by one of the transmit event pulses. The preamble generator and control PROM provides the fixed portion of the preamble containing carrier and bit timing recovery sequence information, unique word and station identification code information to one input terminal each of OR gates 66 and 68. Latches 70 and 72, under the control of the microcomputer, store order wire (OW) information and common signaling channel (CSC) information, respectively. In the preferred embodiment illustrated in FIG. 5, shift registers 74 and 76 are used to split the information of latch 72 between the P-channel gate 66 and Q-channel gate 68, respectively. Shift registers 78 and 80 provide the same coupling between latch 70 and the gates 66, 68. The shift registers 72, 74, 78 and 80 are all clocked in the proper sequence by Timing Control (TC) pulses from the preamble generator control PROM 64.

PSK modems require that bit transitions occur in order to maintain clock synchronization and to meet FCC requirements for power density at the earth's surface, and this requires that the energy spectrum be spread. The energy dispersal is accomplished by the use of a scrambler at the transmit end, with a descrambler at the receive end reversing the scrambler operation and recovering the original data. Tyically, the transmit data, in phase and quadrature, are exclusive-ORed with a positive-negative sequence which is $2-1$ symbols in length at the transmitter and then again with the identical sequence of the receiver. Such scrambling sequences are provided at the Q13 and Q15 outputs of shift register 82, which shift register outputs are applied through gate 84 back to the shift register input. The scrambling seguences are combined in exclusive OR (XOR) gate 86 and 88 with the PQ-channel data, respectively, in order to provide the final input each of the gates 66 and 68. The shift registers 74–80 are all clocked by the transmit clock but receive their load signals in the proper sequence from the control outputs of the preamble generator and control PROM 64. Similarly, the shift register 82 is clocked by the transmit clock but loads its scrambler pattern in response to a control output from the control PROM 64. In this way, the preamble generator and control PROM can control the sequence of inputs to the gates 66 and 68 so that they are non-overlapping.

Figure 6:
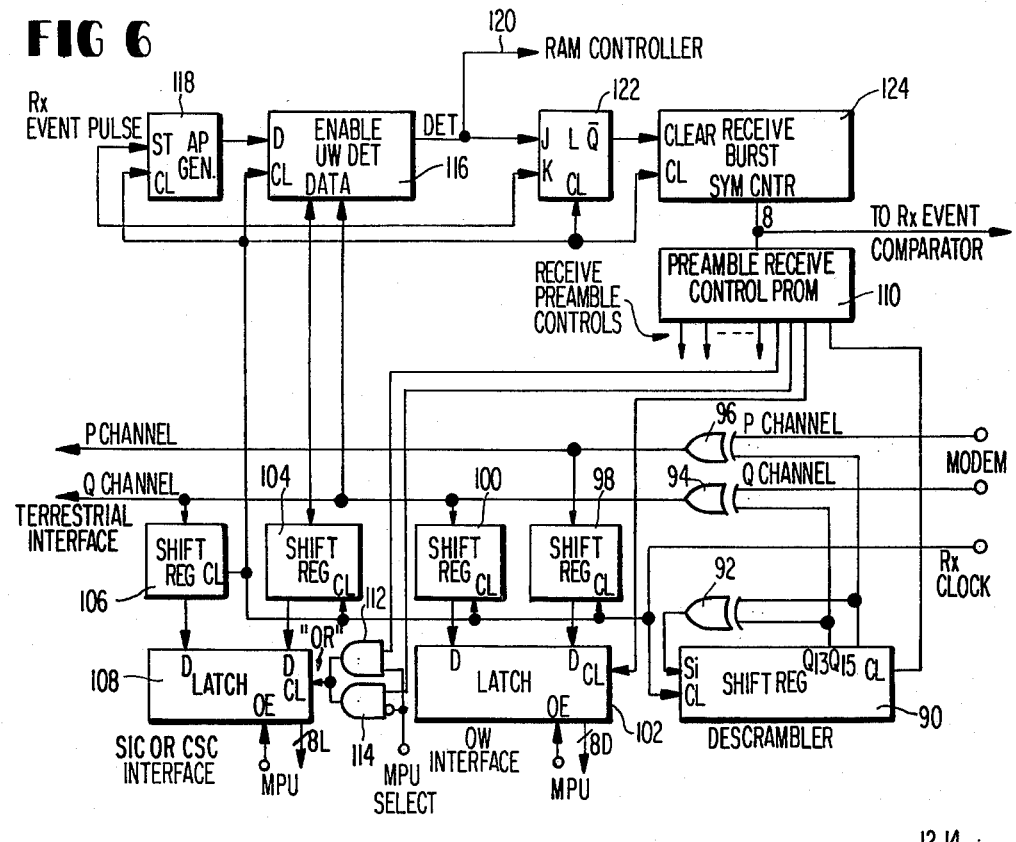
FIG. 6 is a block diagram of the receive high-speed data path module shown in FIG. 1.

FIG. 6 is a block diagram of the components contained in the receive high-speed data path module. The shift register 90 together with XOR gates 92, 94 and 96 perform the descrambling operation and operate in the reverse manner of components 82–88 in FIG. 5. Shift registers 98 and 100 remove the order wire (OW) information from the preamble and provide it as data to the latch 102. Similarly, the shift registers 106 and 108 remove the signaling channel information from the preamble and provide it as input data to the latch 108. The latches 102 and 108 are clocked by signals from the preamble receive control PROM 110 to ensure that the proper information is stored in the latches. Two different clock signals are provided by the PROM 110 to the latch 108 through gates 112 and 114 under the selective control of the microprocessor. One of these clock signals will result in the latching of the common signaling channel information while the other of the selectable clock signals will rsult in the latching of the station identification code information. The descrambler load signal is also provided by the PROM 110.

The unique word detector 116 monitors the P and Q-channel data after being enabled by the aperture generator 118 which, in turn, responds to the output from comparator 42 as described above. The output pulse from aperture generator 118 determines the detection aperture and is typically seven symbols in duration. The output 120 from the unique word detector is received as one input by the gate 46 in FIG. 3.

The flip flop 122 and counter 124 constitute a resettable receive burst symbol counter the output of which is received by both the PROM 110 and the comparator 44 in FIG. 3.

Figure 7:
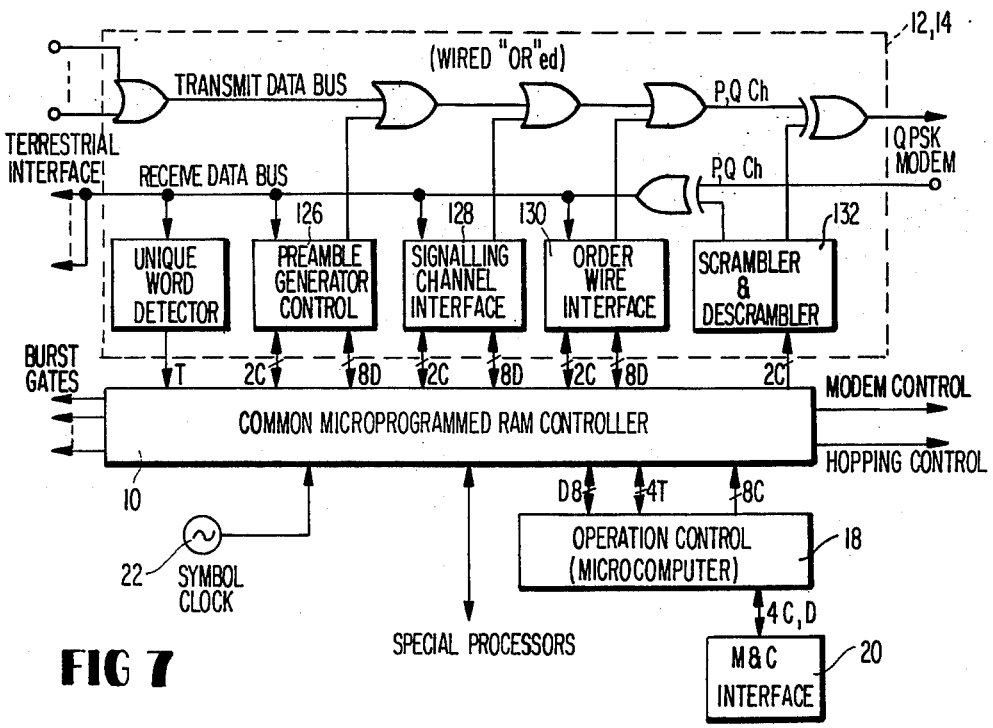
FIG. 7 is a block diagram illustrating the modular construction of the microprogrammed TDMA terminal controller illustrated in FIG. 1.
Figure 9A:
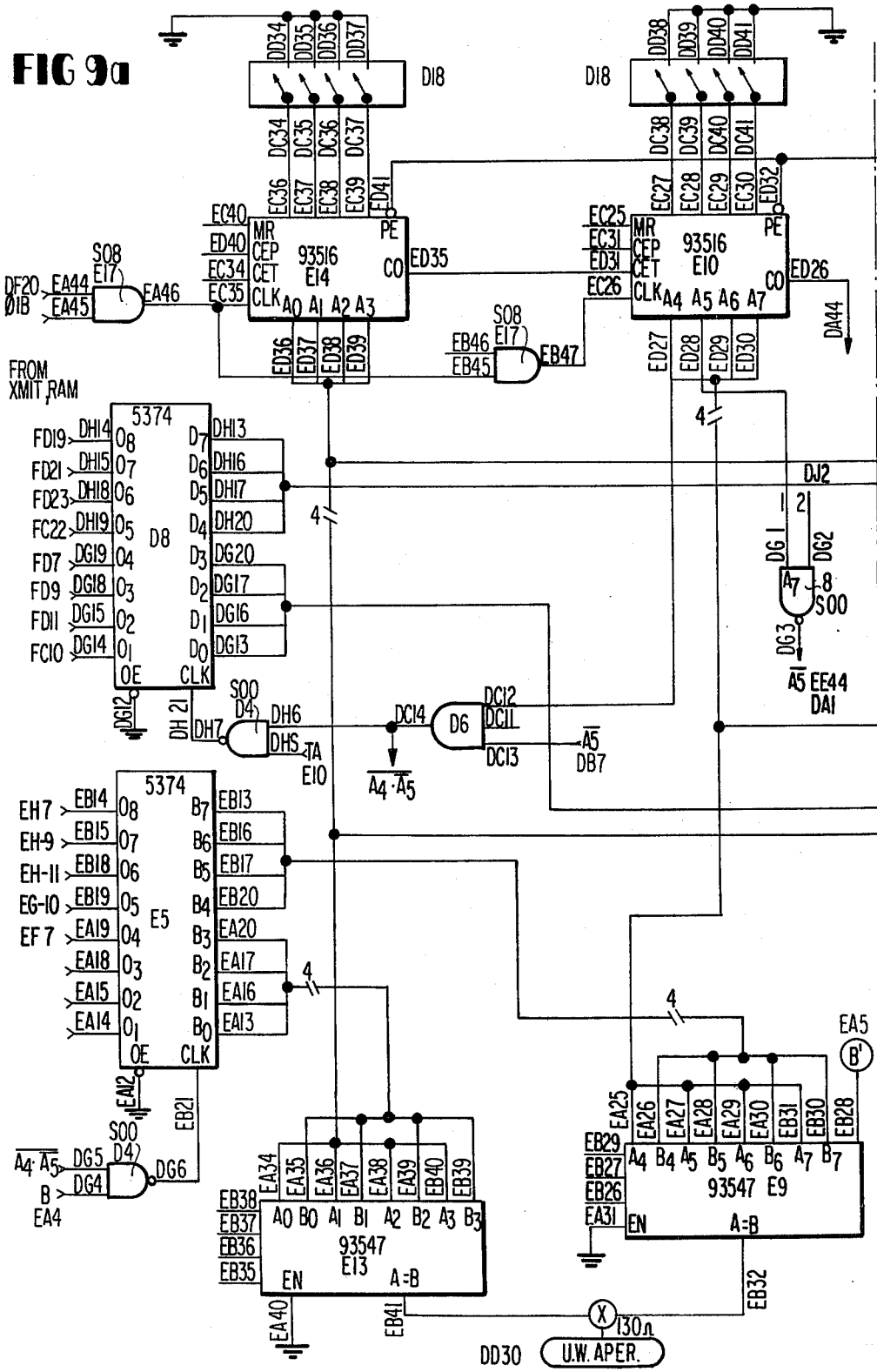
FIG. 9 is a schematic diagram of the fine resolution counter included within the RAM controller.
Figure 9B:
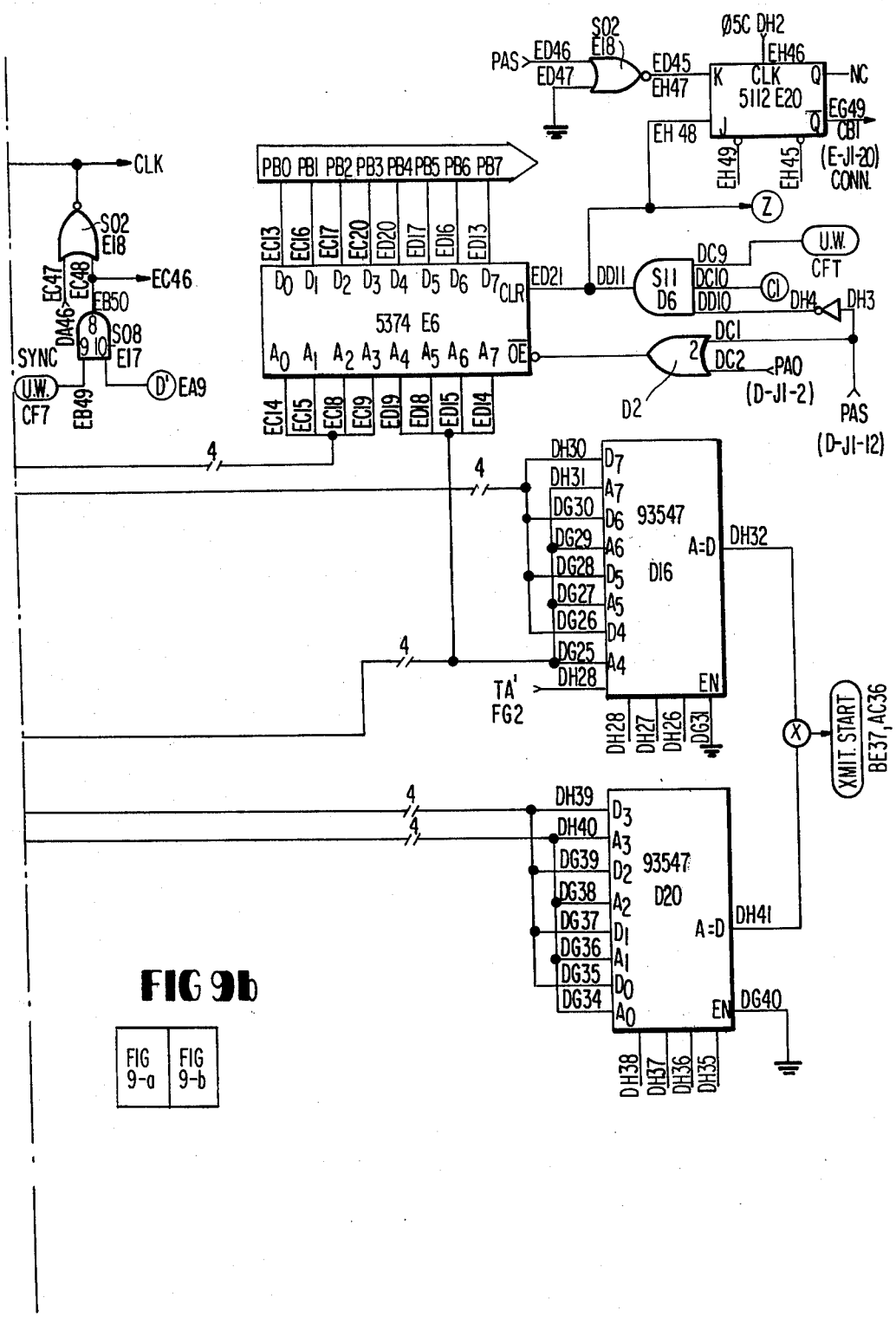
Figure 10A:
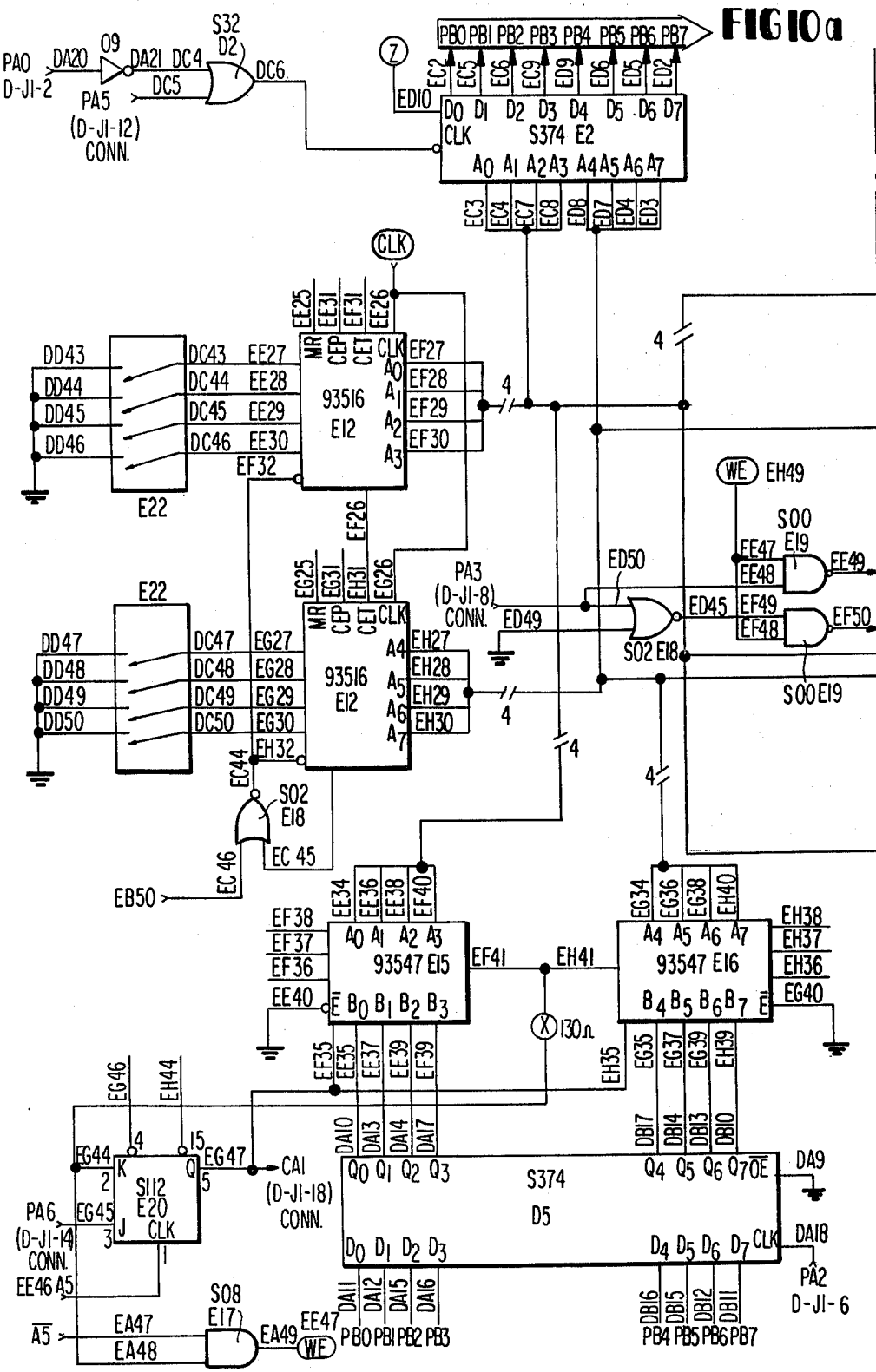
FIG. 10 is a schematic diagram of a portion of the RAM controller including the coarse counter and control RAM.
Figure 10B:
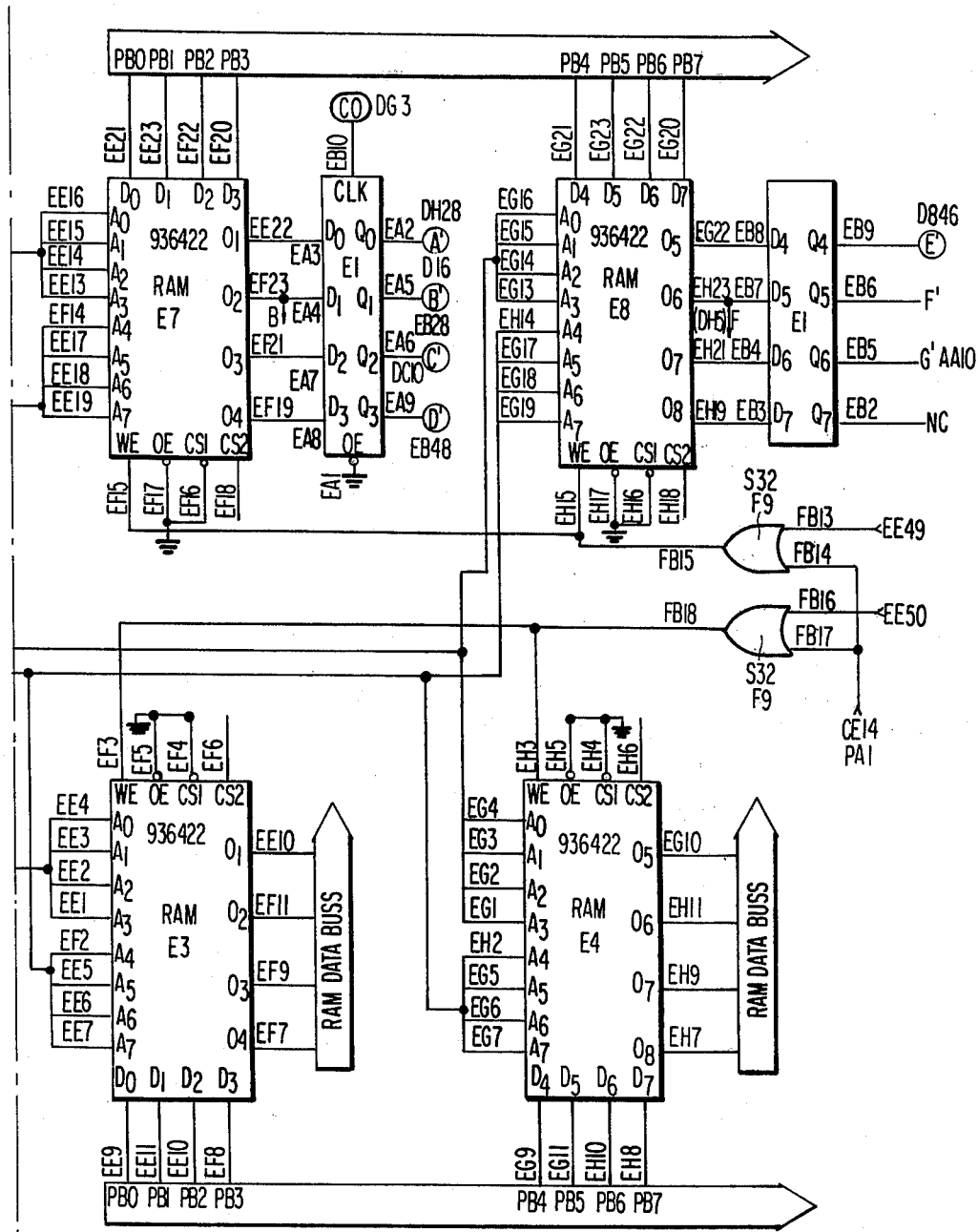
Figure 11A:
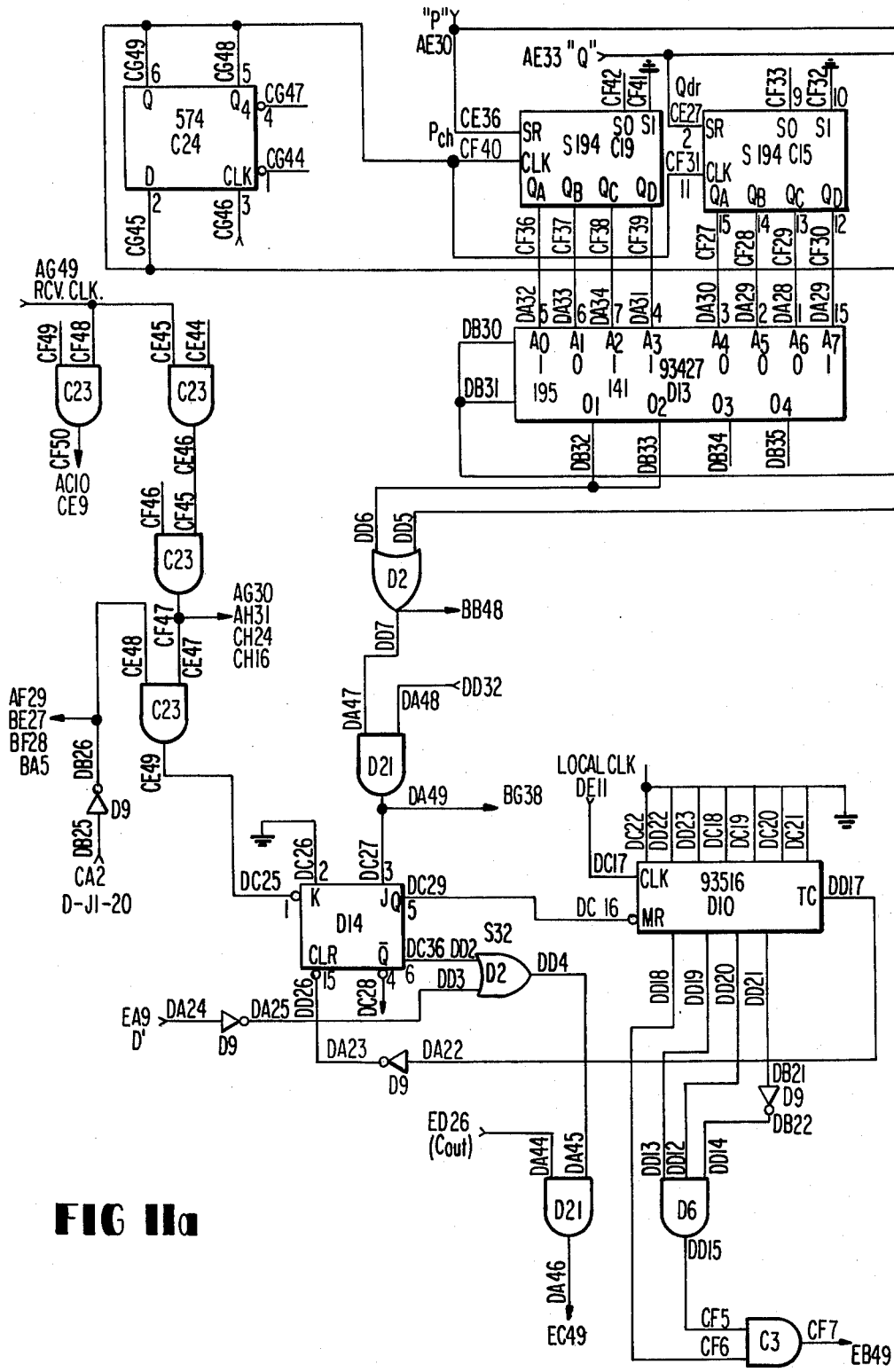
Figure 12:
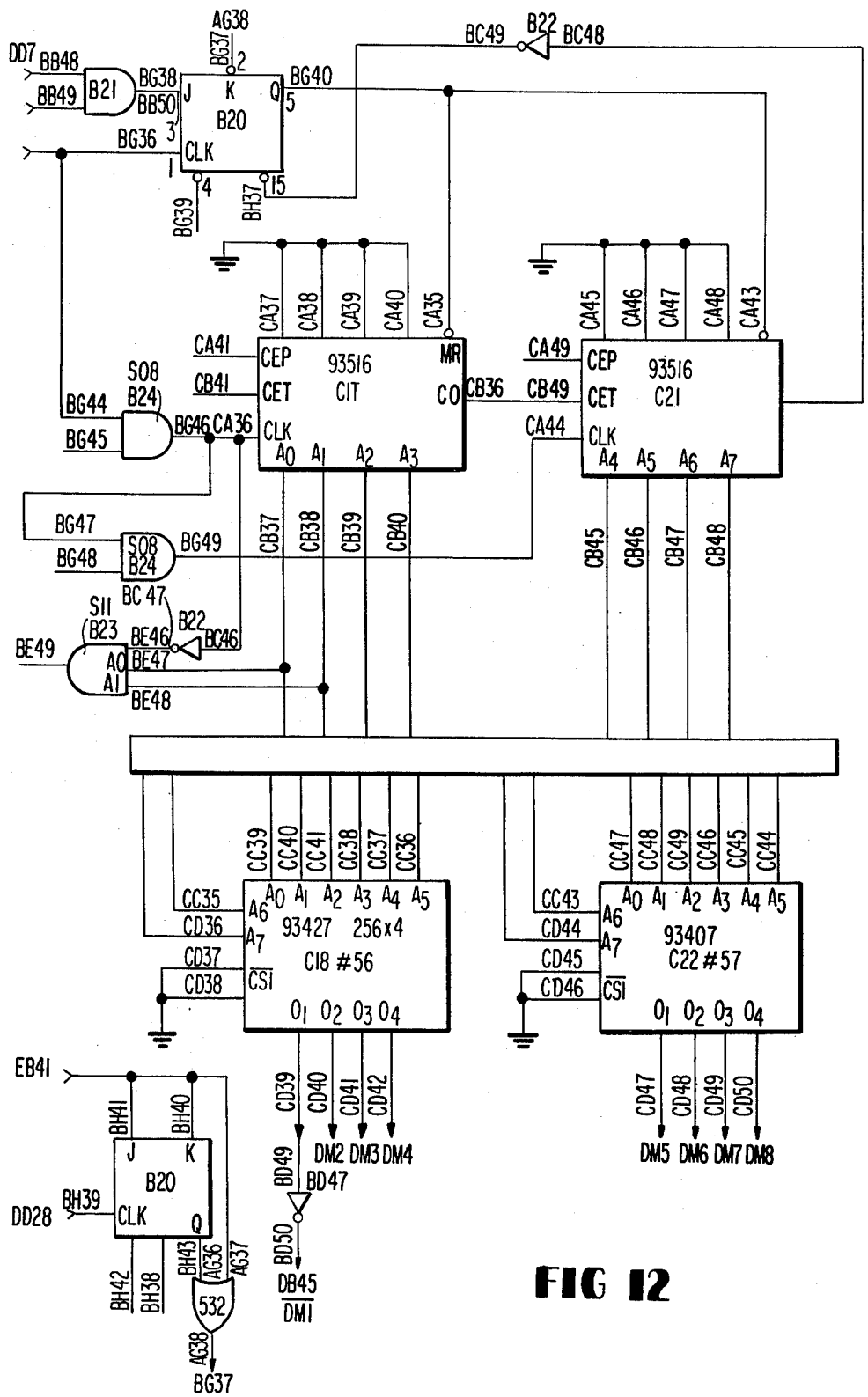
FIG. 12 is a schematic diagram of the receive clock counter and demultiplexer control included within the receive data path module.
Figure 13:
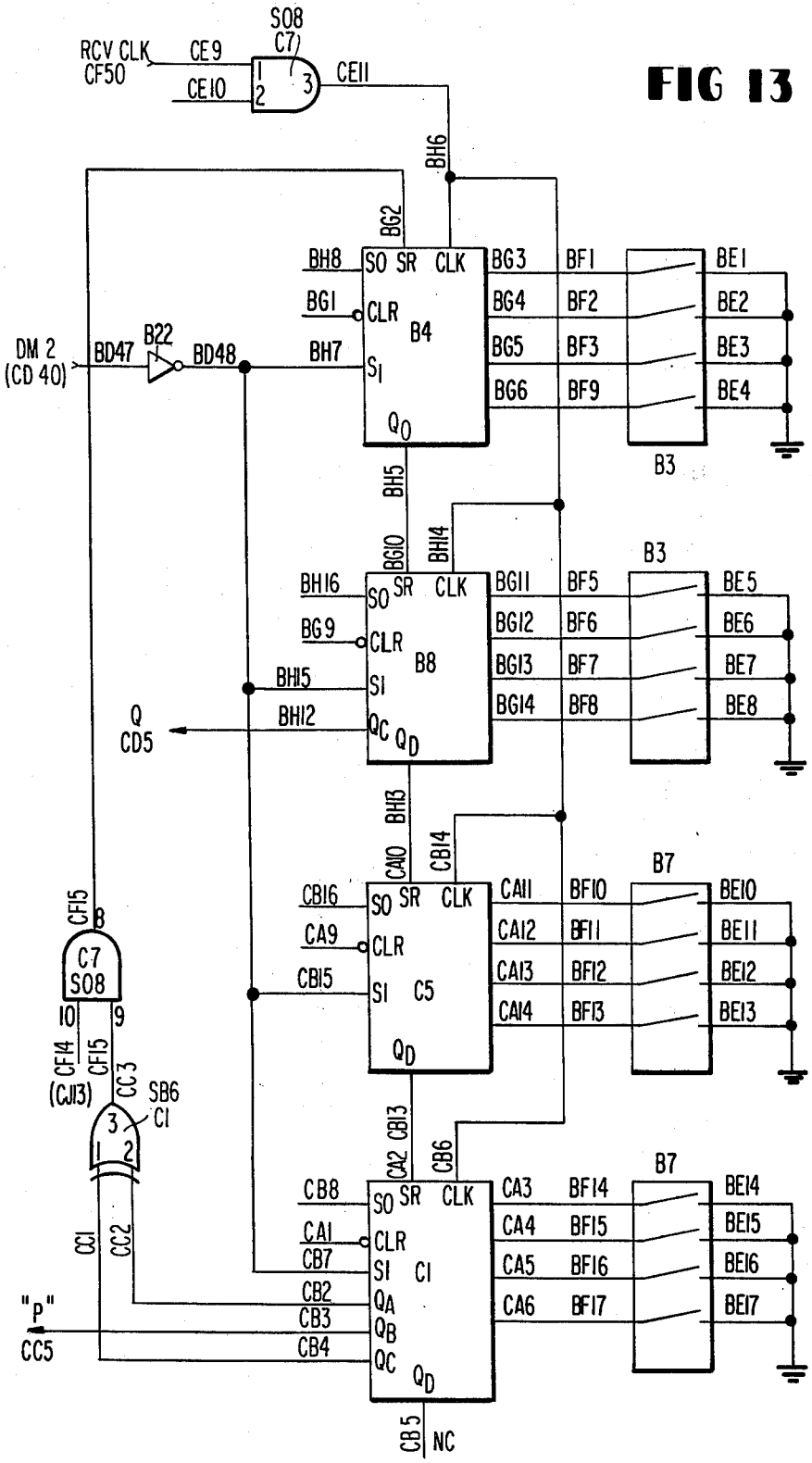
FIG. 13 is a schematic diagram of the descrambler included within the receive data path module.
Figure 14A:
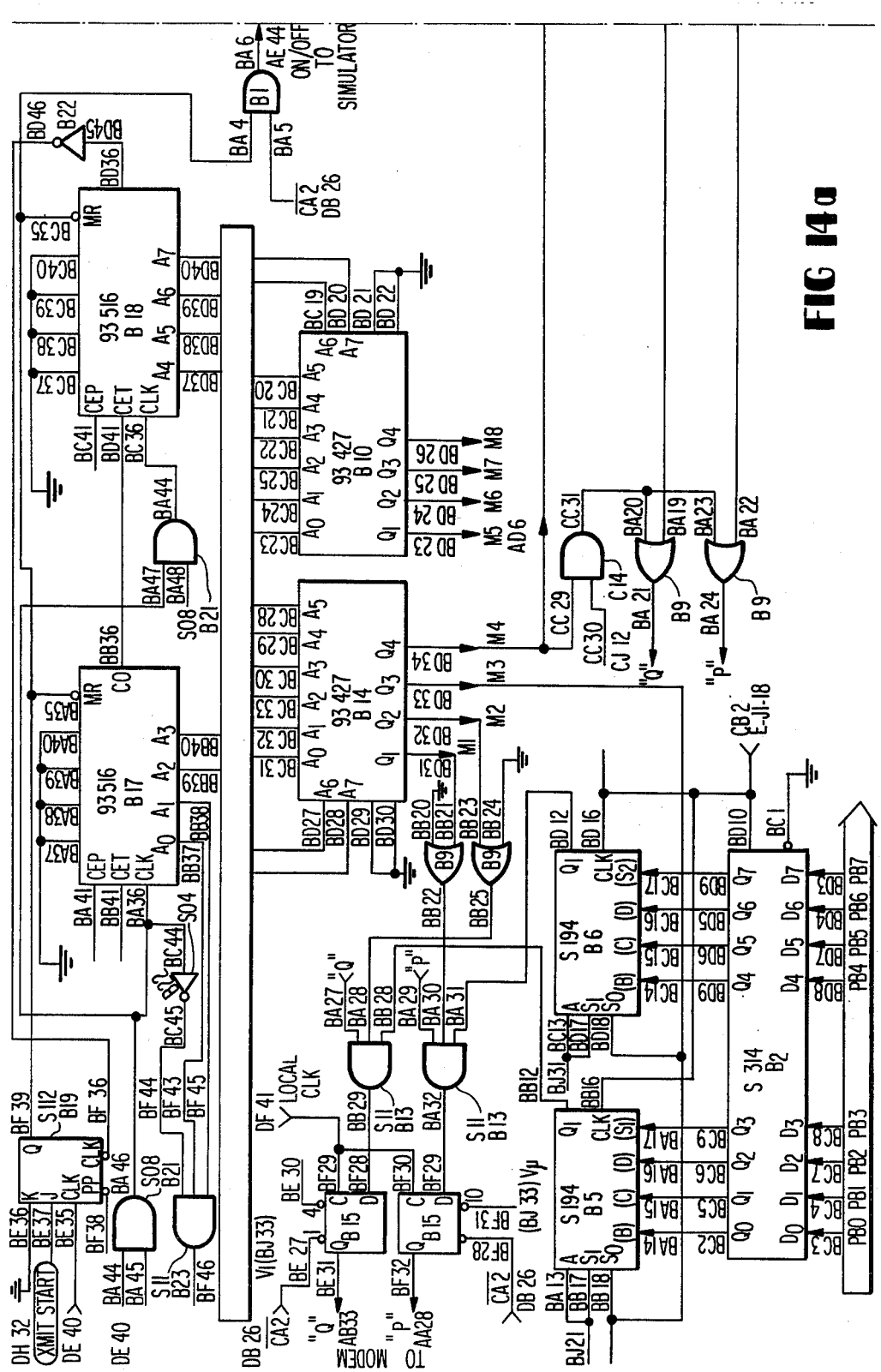
Figure 15A:
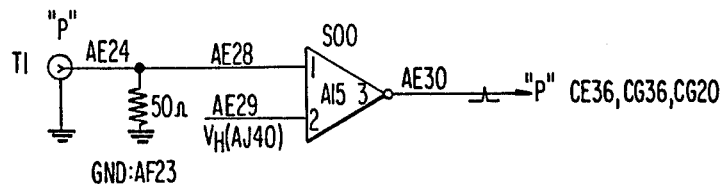
FIGS. 15(a)–15(d) are schematic diagrams of receiver circuitry in the receive data path module for receiving data from the modem.
Figure 15B:
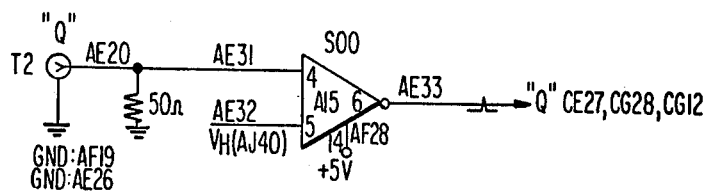
Figure 15C:
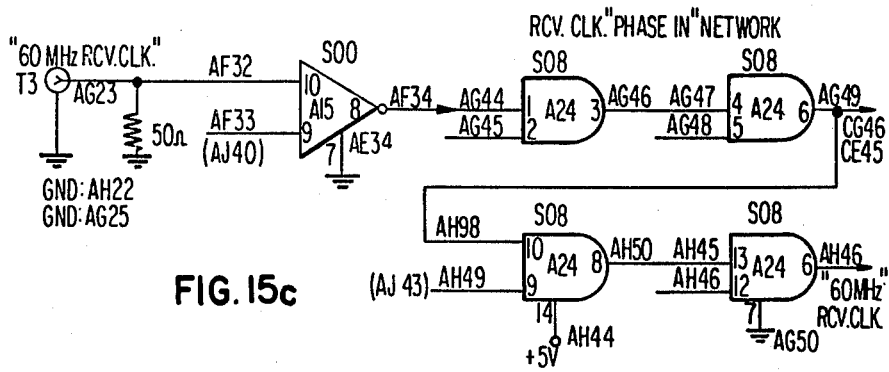
Figure 15D:
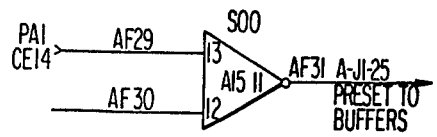
Figure 15E:
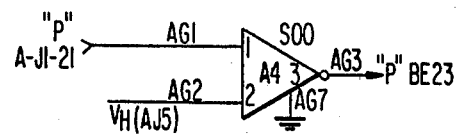
FIGS. 15(e) and 15(f) are schematic diagrams of receiver circuitry for receiving data from the multiplexer.
Figure 15F:
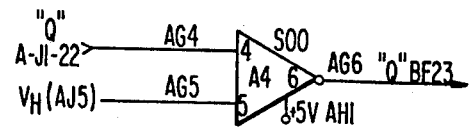
Figure 15G:
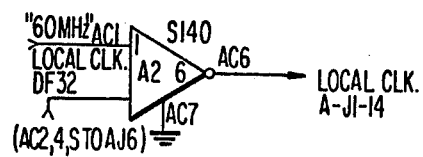
FIGS. 15(g) and 15(h) are schematic diagrams of driver circuits used to send data to the multiplexer.
Figure 15H:
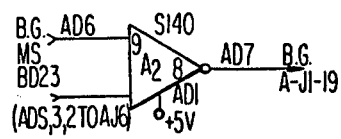
Figure 15I:
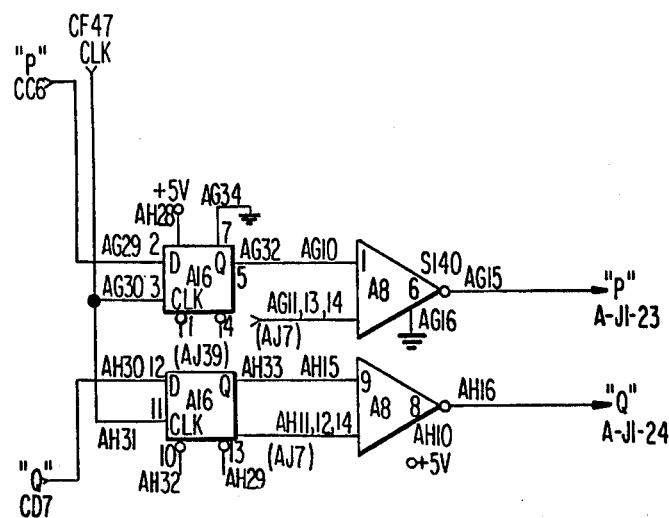
FIGS. 15(i)–15(k) are schematic diagrams of driver circuits used to send data to the demultiplexer.
Figure 15J:
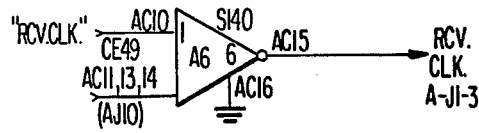
Figure 15K:
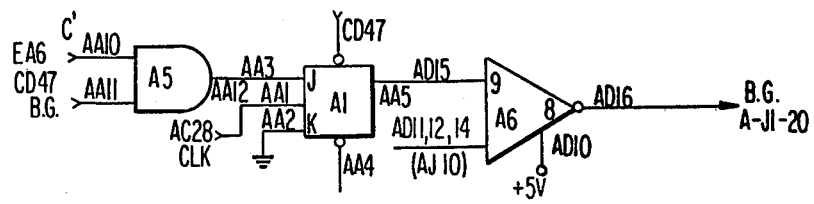
Figure 15L:
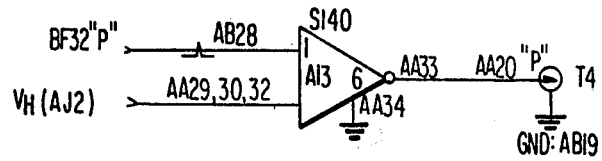
FIGS. 15(l)–15(o) are schematic diagrams of driver circuits used to send data to the modem.
Figure 15M:
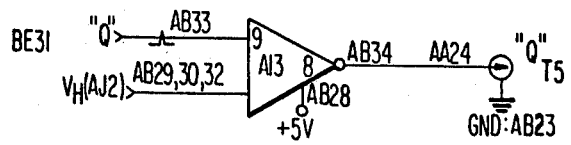
Figure 15N:
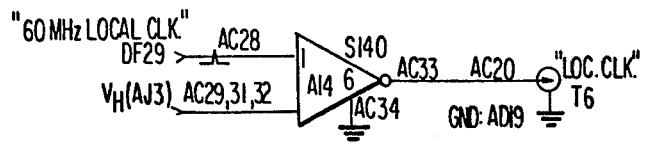
Figure 15O:
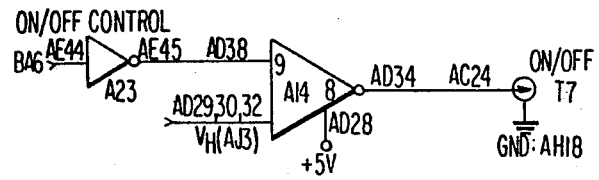
Figure 16:
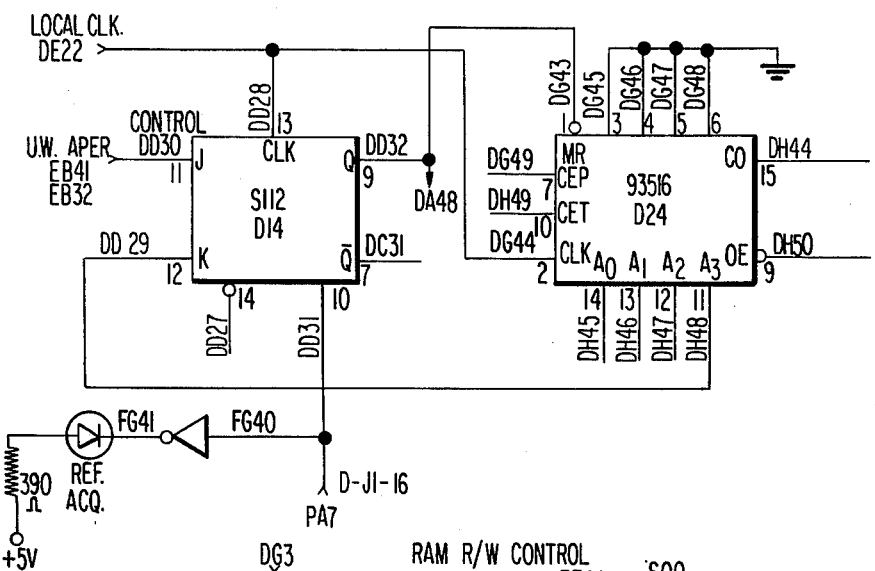
FIG. 16 is a schematic diagram of the unique word aperture generator included within the receive data path module.
Figure 17:
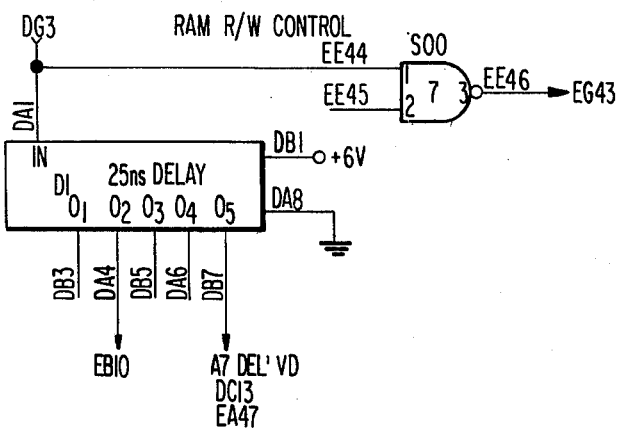
FIG. 17 is a schematic diagram of a portion of the read/write control circuitry included within the RAM controller.
Figure 18A:
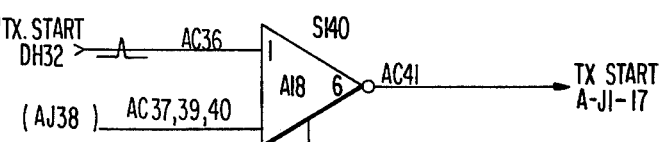
FIGS. 18a and 18b are schematic diagrams of driver circuits used to generate transmit start and unique word detection pulses, respectively.
Figure 18B:
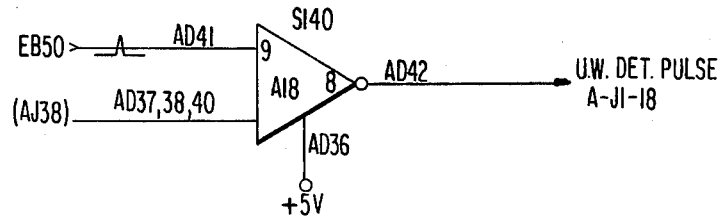
Figure 19:
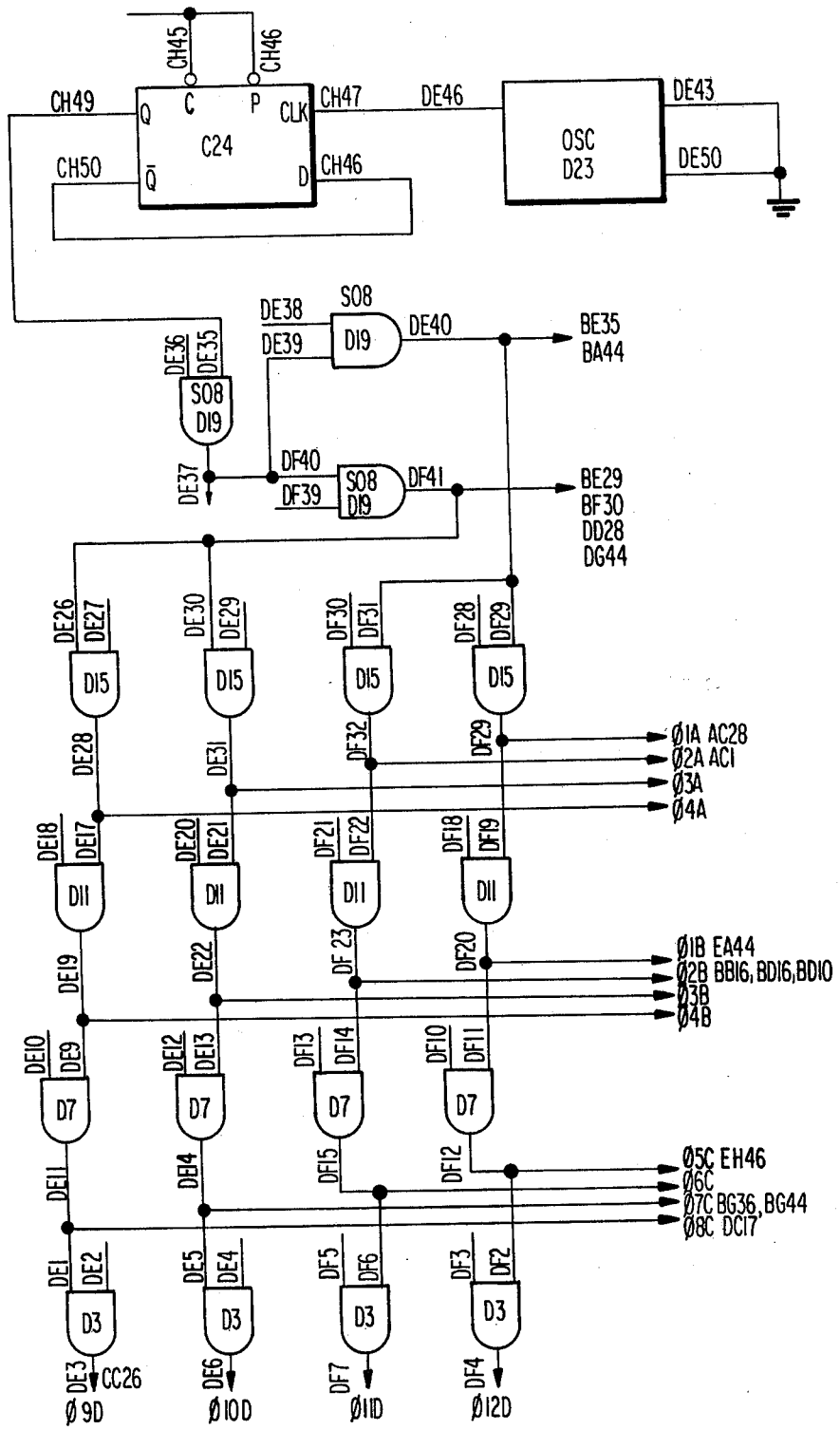
FIG. 19 is an illustration of the clock fan out circuitry used in the RAM controller.
Figure 20:
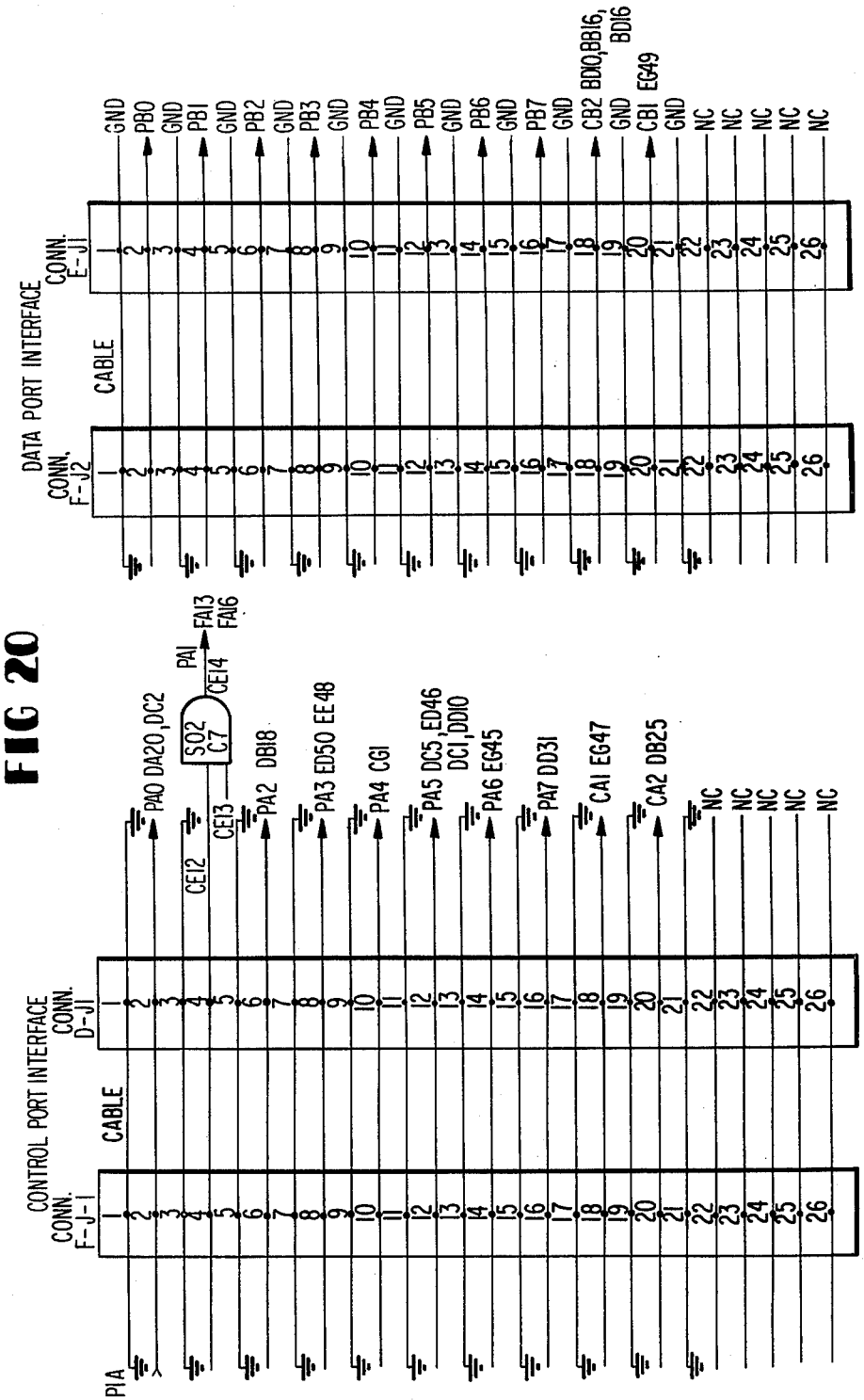
FIG. 20 is an illustration of the control and data port interface connections in the RAM controller.
Figure 21A:
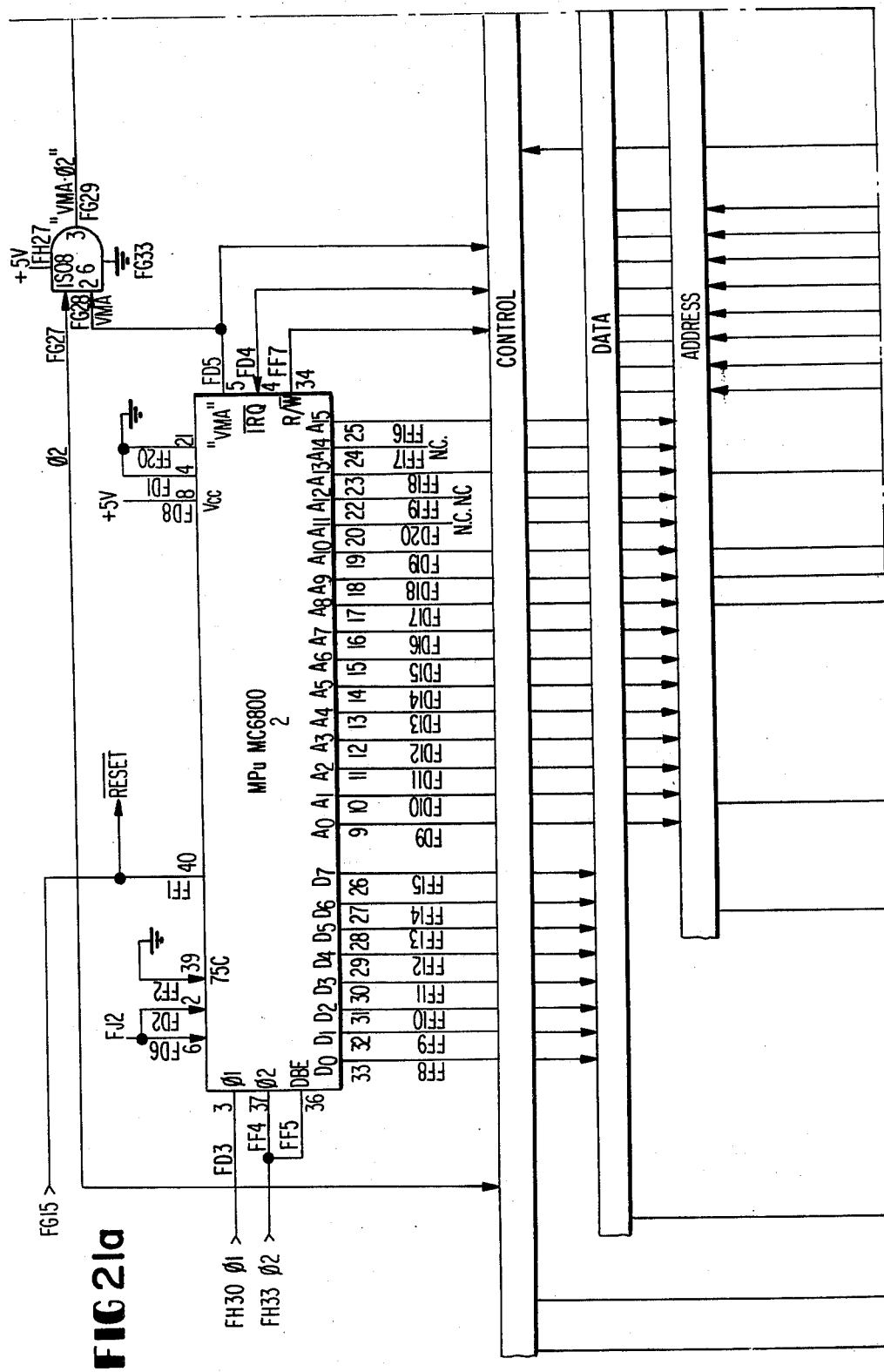
Figure 21B:
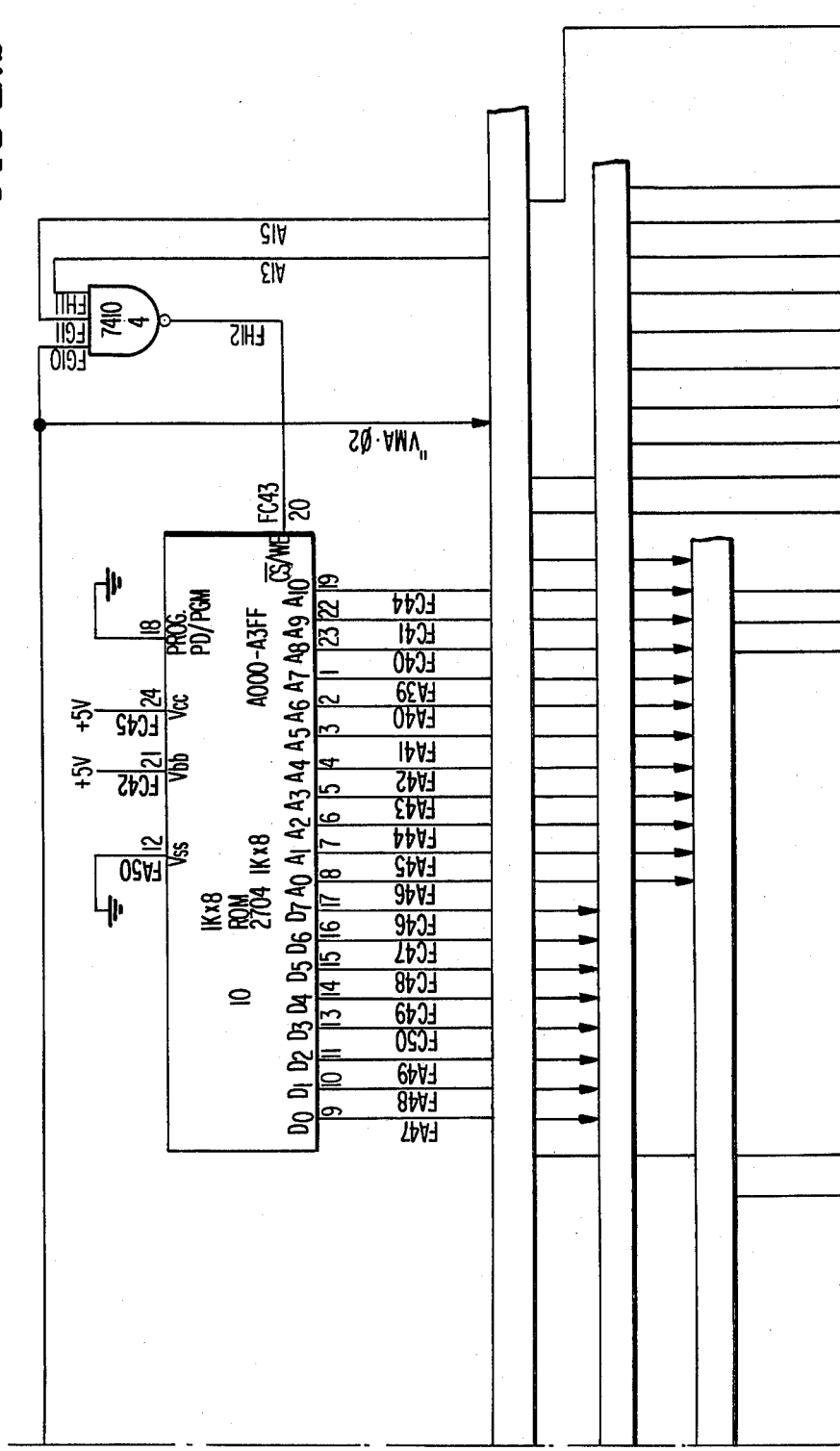
Figure 21C:
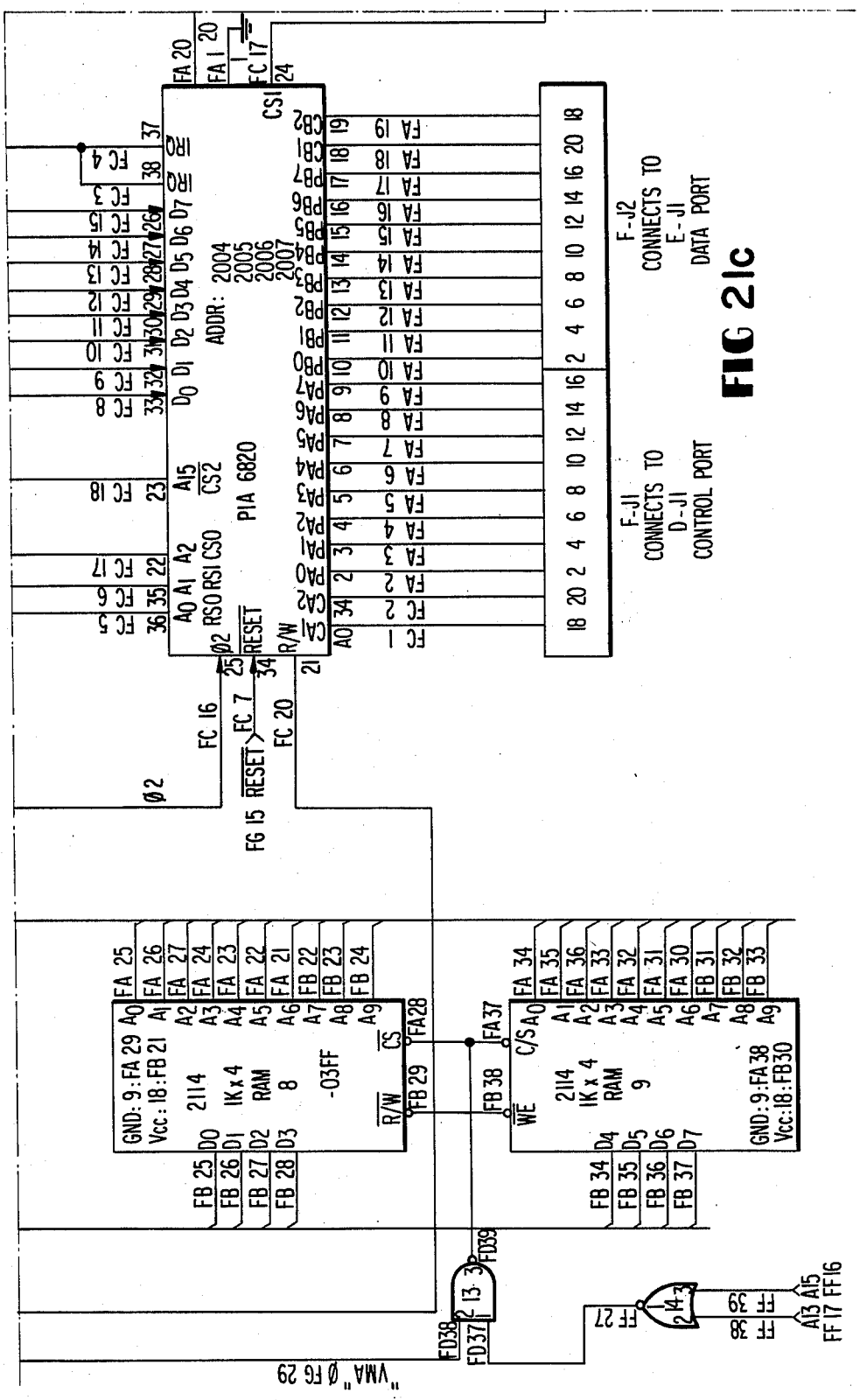
Figure 22:
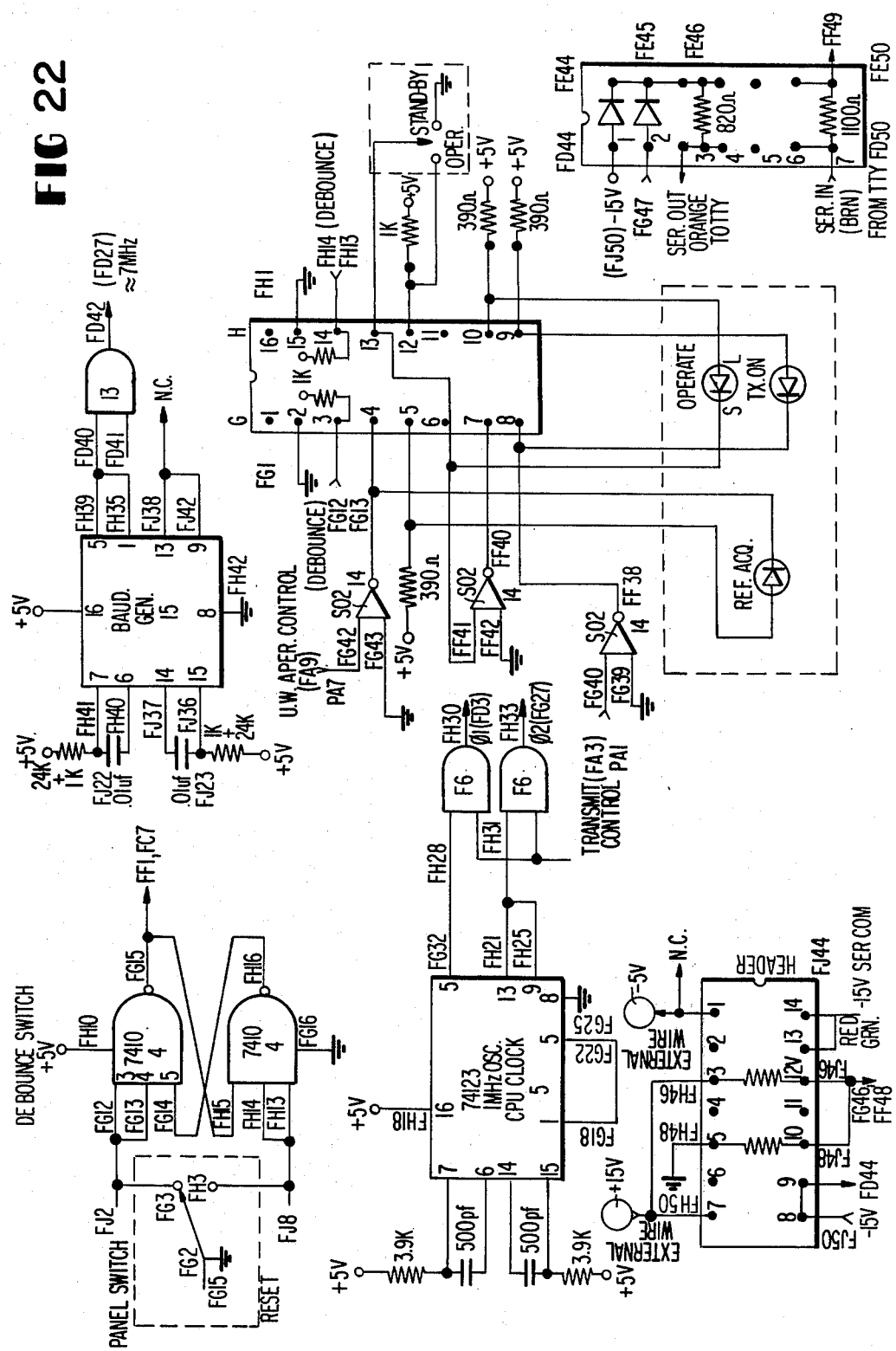
FIG. 22 illustrates various miscellaneous circuits used in the TDMA terminal controller.
Figure 23:
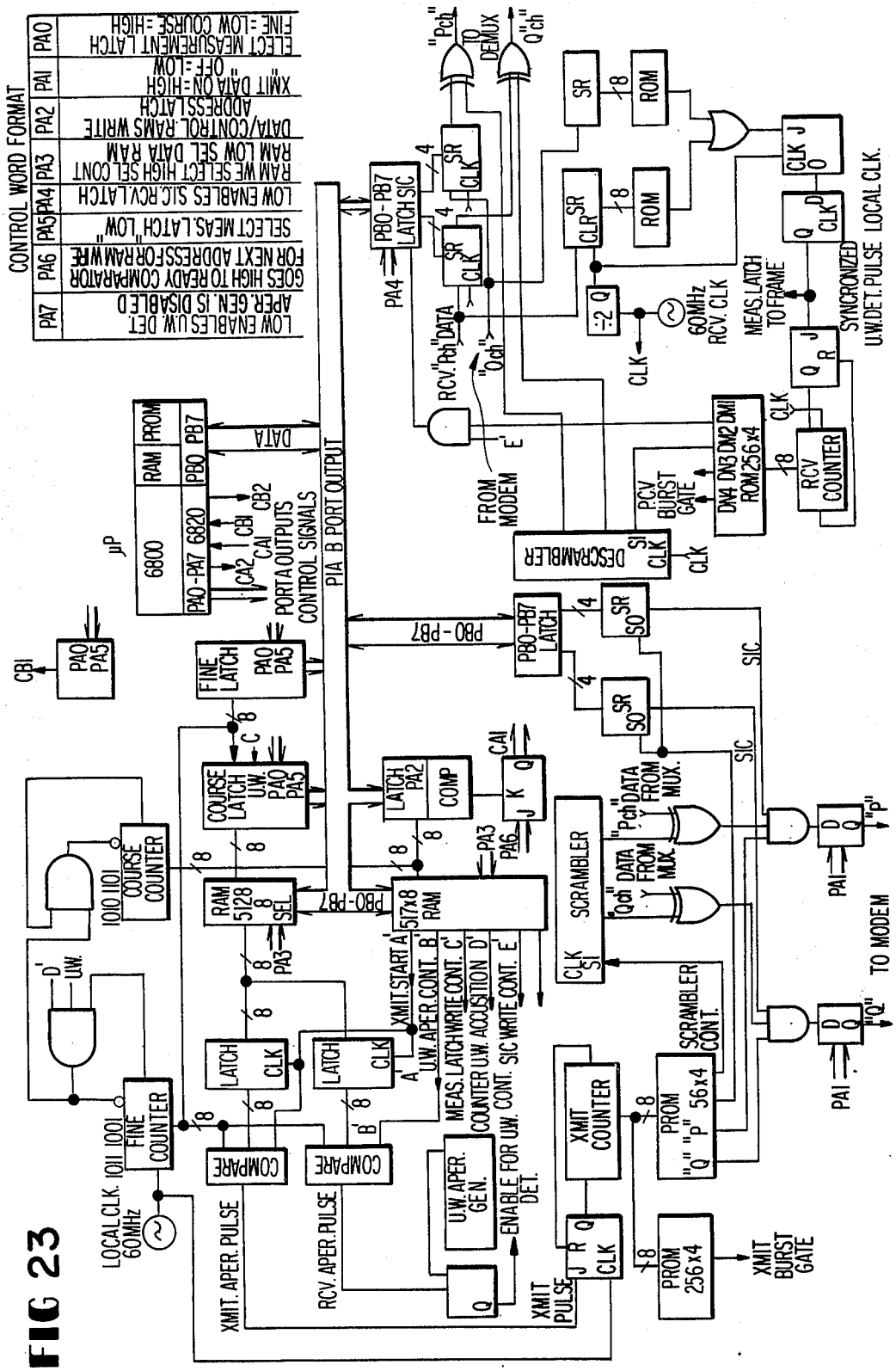
FIG. 23 is a block diagram illustrating the overall arrangement of the terminal controller.

Shown in FIG. 7 is a block diagram illustrating the modularity of the terminal controller according to the presents invention. The preamble generator and control PROMs 64 and 110 in FIGS. 5 and 6 can be combined into a single module together with the transmit and receive burst symbol counters. The signaling channel interface constituting latch 72 and shift registers 74 and 76 in FIG. 5 and latch 108 together with shift registers 104 and 106 in FIG. 6 can be combined into a single module 128. The order wire interface comprising latch 70 and registers 78 and 80 in FIG. 5 and latch 102 and registers 98 and 100 in FIG. 6 may also be combined into a single module 130. Finally, the scrambler 82-88 and descrambler 90-96 may be combined into a single module 132. The unique word detector 116, 118 in FIG. 6 has no corresponding component in the transmit data path module of FIG. 5 and, therefore, this detector is provided in its own module.

In the baseline design, all of the modules associated with the transmit and receive high-speed data paths are implemented as shown in FIGS. 5 and 6, with the exception of the voice order wire module. A voice order wire circuit provided is part of the voice channel/codec equipment not shown as part of this design. The voice order wire which is included as part of the burst preamble structure of the INTELSAT Prototype TDMA (BG/1-18) can be added to the base line design by including the required high-speed data path interface module and a separate voice codec and special dedicated microprocessor control subsystem.

The operation control microcomputer 18 and Monitor and Control (M&C) interface 20 are realized by standard off-the shelf LSI microprocessor parts e.g., of the Motorola 6800 Family. A block diagram of the microcomputer and M&C interface is shown in FIG. 8. This section of the base line TDMA controller employs approximately 11 LSI and MSI integrated circuit chips and uses less than 10 watts of power. The microcomputer interface to the controller 10 is provided through a single 6820 PIA, which provides 20 interconnecting data and control lines. The interface is provided through a RS 232 or TTY 20ma current loop. This arrangement is provided by a 6850 asynchronous communication interface chip. The operation of the M&C interface is well known in the art.

The microprogrammed TDMA terminal controller according to the present invention provides flexibility through a modular approach to system implementation. By using hardware modularity and a unique Common Microprogrammed RAM Controller, as shown in FIG. 7, the terminal can be configured to meet a wide range of system requirements, including those for INTELSAT Prototype TDMA. Additional dedicated processors can be interfaced to handle special requirements such as INTELSAT Prototype order wire signaling and bit error rate (BER) monitoring. The microprogrammed controller is common to all high speed data path modules where multiple use of the controller constitutes a major reduction in terminal hardware and associated recurring costs.

The baseline microprogrammed TDMA terminal controller is configured to accommodate a variety of frame lengths up to 216 symbols/frame and burst bit rates up to 120 Mbits/sec using QPSK modulation. A maximum combined total of 256 separate receive and transmit bursts can be processed and the data multiplexed and demultiplexed to separate terrestrial interface ports. This combination of features makes this hardware very effective for handling a variety of terrestrial interface arrangements. The baseline configuration is easily expanded to longer frame lengths and an increase in the number of burst and terrestrial interface ports.

The disclosed configuration is based on the Schottky and lower power Schottky TTL integrated circuits. It uses less than 150 commerically available LSI and MSI chips and requires less than 50 watts of power. The entire base line design is housed on a single $8 \times 16 \times 1.5$ inch wire wrap board. The microprogrammed TDMA terminal controller has been physically implemented and tested for operation in a 3-terminal network configuration. Tests have been successfully performed using both a 125 and 750 $\mu$sec frame and 120 and 60 Mbits/sec burst bit rates, and the base line hardware has also been interconnected with the 60-channel terrestrial interface.

Another feature of the baseline design is the microprogrammed controller/microprocessor interface. In the base line design, this interface is limited to 20 parallel lines implemented with one Peripheral Interface Adapter (PIA) such as Motorola type 6820. Of the interface lines, 8 are for bi-directional data transfers, 8 are for direct terminal control by the microprocessor interface, and 4 are special interface lines. Use of the 8 parallel bi-directional data lines includes electing the RAM address and transferring the microprogram words (8 parallel bits) to the control RAM. The 8 control and 4 interface lines are used in selecting various systems functions, including the RAM write operation. The interface control lines are used for "hand shaking" between the microprocessor and controller.

The novel features of the terminal controller according to the present invention include:

(1) A unique hardware design using a high-speed microprogrammed RAM controller with a new "Forward Control" technique which resolves control timing to the symbol level and a horizontal control organization which controls multiple high-speed data path modules. This structure is a significant improvement in prior art microcontroller design for digital communication applications where control timing resolution is a primary requirement.

(2) A dynamically reprogrammable control which permits on-line reconfiguration of transmit and receive burst using RAM-based controller storage and a "fly-by" reprogramming technique. Use of this new technique avoids the requirement for using two separate control RAMs stores, one for accurate control and the other for programming, in a so called "ping-pong" arrangement.

(3) A single microprogrammed controller and "split" frame symbol counter for high-speed simultaneous control of all TDMA transmit and receive terminal functions. The split-frame symbol counter in itself is a new feature which avoids the speed limitations of a fully synchronous frame counter and allows Schottky TTL, through the use of a "look-ahead" external preset IC counter to be used in the base line design at 60 Msym/sec.

(4) A very simply terrestrial interface arrangement which shares the common microprogrammed controller. In previous TDMA terminal equipment, the terrestrial interface was controlled by a separate burst multiplexer/demultiplexer.

(5) A floating TDMA frame reference derived from a selected burst within the TDMA frame at an arbitrary assigned frame position, or the frame reference timing ca be derived from the average timing of a number of TDMA bursts. Using this new technique, reference burst replacement is greatly simplified.

(6) Multiple mode operation with the loopback, feedback, or open-loop methods of transmit burst synchronization where all synchronization modes can be accommodated in a single network.

(7) Integrated microcomputer controlled interface which provides for both local and/or remote monitor and control.

The following is a computer program which has been found to result in satisfactory operation of the TDMA controller by the microcomputer.

LOW COST TDMA OPERATING PROGRAM
THIS PROGRAM GENERATES THE CONTROLS AND PERFORMS
THE CALCULATIONS NECESSARY FOR OPERATING
THE 6800 MPU BASED LOW COST TDMA TERMINAL

|  | A000 > |  |  | ORG | 0A000H ;SUBROUTINES STARTING LOCATION |
|---|---|---|---|---|---|
|  | A5BA | TTYT | EQU | 0A5BAH | TRANSFER ADDRESS TO MONITOR TTY INPUT |
|  | A5BA | DETER | EQU | 0A5BAH | DETECT READY ERROR FOR RAM WRITE |
|  | A5BA | IXAER | EQU | 0A5BAH | TRANSMIT TIMING ACQUISITION ERROR |
|  | A5BA | REFER | EQU | 0A5BAH | REFERENCE TIMING ERROR |
|  | A5BA | MEAER | EQU | 0A5BAH | MEASUREMENT LATCH READ ERROR |
|  | 0100 | RMLTRP | EQU | 0100H | ADDRESS OF RML TRAP INSTRUCTIONS |
|  | 0100 | RMLTP1 | EQU | 0100H | 1ST INST |
|  | 0101 | RMLTP2 | EQU | 0101H | 1ST INST COURSE |
|  | 0102 | RMLTP3 | EQU | 0102H | 1ST INST FINE |
| SUBROUTINE TO INITIALIZE PIA A SIDE (CONTROL) WITH UW DET OFF (2004) | | | | | |
| A000 | CE2004 | INITCO | LDX | #2004H | SET INDEX REGISTER |
| A003 | 6F01 |  | CLR | 02,X | SELECT DATA REGISTER A |
| A005 | 86FF |  | LDA A | #0FFH | DATA DIRECTION PARAMETER |
| A007 | A700 |  | STA A | 00,X | SETS DIRECTION AS OUTPUT |
| A009 | 8604 |  | LDA A | #04H | DATA REGISTER SELECT PARAMETER UW DET OFF |
| A00B | A701 |  | STA A | 01,X | SELECT DATA REGISTER A SIDE |
| A00D | 39 |  | RTS |  | RETURN |
| SUBROUTINE TO INITIALIZE PIA A SIDE (CONTROL) WITH UW DET ON (2004) | | | | | |
| A00E | CE2004 | INITC | LDX | #2004H | SET INDEX REG. |
| A011 | 6F01 |  | CLR | 01,X | SELECT DATA DIRECTION REG. A |
| A013 | 86FF |  | LDA A | #0FFH | DATA DIRECTION PARAMETER |
| A015 | H700 |  | STA A | 00,X | SETS DIRECTION AS OUTPUT |
| A017 | 8634 |  | LDA A | #34H | DATA REG. SELECT PARAMETER WITH UW DET ON |
| A019 | A701 |  | STA A | 01,X | SELECT DATA REG A |
| A01B | 39 |  | RTS |  | RETURN |
| SUBROUTINE TO INITIALIZE PIA B SIDE FOR OUTPUT (DATA) 2006 | | | | | |
| A01C | 6F03 | INITDO | CLR | 03,X | SELECT DATA DIRECTION REG |
| A01E | 86FF |  | LDA A | #0FFH | ENTER ONES INTO DIRECTION REG |
| A020 | A702 |  | STA A | 02,X | SET REG B AS OUTPUT |
| A022 | 8604 |  | LDA A | #04H | DATA DIRECTION PARAMETER |
| A024 | A703 |  | STA A | 03,X | SELECT DATA REG |
| A026 | 39 |  | RTS |  | RETURN |
| SUBROUTINE TO WRITE THE MEMORY ADDRESS LATCH WITH TX OFF ENTER WITH COURSE ADDRESS IN FD | | | | | |
| A027 | D6FD | WMLTCH | LDA B | 0FDH | LOAD CONTENTS OF FD INTO ACC B |
| A029 | E702 |  | STA B | 02,X | OUTPUT FD AS DATA |
| A02B | 8631 |  | LDA A | #31H | LATCH WRITE CONTROL PARAMETER (31) |
| A02D | A700 |  | STA A | 00,X | WRITE MEMORY LATCH |

-continued

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

| A02F | 8635 | | LDA A | #35H | DISABLE LATCH WRITE CONTROL PARAMETER |
|---|---|---|---|---|---|
| A031 | A700 | | STA A | 00,X | DISABLE MEMORY ADDRESS LATCH WRITE |
| A033 | 39 | | RTS | | RETURN |

SUBROUTINE TO WRITE MEMORY ADDRESS LATCH WITH TX ON
ENTER WITH COURSE ADDRESS IN FD

| A034 | 96FD | WMLTX | LDA A | 0FDH | LOAD ML BUFFER |
|---|---|---|---|---|---|
| A036 | A702 | | STA A | 02,X | OUTPUT FD |
| A038 | 86B3 | | LDA A | #0B3H | ML WRITE CONTROL PARAMETER WITH IX ON |
| A03A | A700 | | STA A | 00,X | WRITE ML |
| A03C | 86B7 | | LDA A | #0B7H | DISABLE ML WRITE WITH TX ON |
| A03E | A700 | | STA A | 00,X | DISABLE ML WRITE |
| A040 | 39 | | RTS | | RETURN |

SUBROUTINE TO WRITE THE CONTROL RAM WITH TX OFF

| A041 | 867D | WCRAM | LDA A | #7DH | CONTROL RAM WRITE PATTERN |
|---|---|---|---|---|---|
| A043 | A700 | | STA A | 00,X | ENABLE RAM WRITE |
| A045 | 863D | | LDA A | #3DH | CONTROL RAM WRITE DISABLE PATTERN |
| A047 | A700 | | STA A | 00,X | DISABLE RAM WRITE |
| A049 | 39 | | RTS | | RETURN |

SUBROUTINE TO WRITE CONTROL RAM WITH TX ON

| A04A | 86FF | WCRX | LDA A | #0FFH | CONTROL RAM WRITE PATTERN WITH TX ON |
|---|---|---|---|---|---|
| A04C | A700 | | STA A | 00,X | ENABLE RAM WRITE |
| A04E | 86BF | | LDA A | #0BFH | CONTROL RAM DISABLE PATTERN WITH TX ON |
| A050 | A700 | | STA A | 00,X | DISABLE RAM WRITE |
| A052 | 39 | | RTS | | RETURN |

SUBROUTINE TO WRITE DATA RAM WITH TX OFF

| A053 | 8675 | WDRAM | LDA A | #75H | WRITE DATA RAM CONTROL PATTERN |
|---|---|---|---|---|---|
| A055 | A700 | | STA A | 00,X | ENABLE RAM WRITE |
| A057 | 8635 | | LDA A | #35H | DISABLE RAM WRITE PATTERN |
| A059 | A700 | | STA A | 00,X | DISABLE RAM WRITE |
| A05B | 39 | | RTS | | RETURN |

SUBROUTINE TO WRITE DATA RAM WITH TX ON

| A05C | 86F7 | WDRX | LDA A | #0F7H | DATA RAM WRITE PATTERN WITH TX ON |
|---|---|---|---|---|---|
| A05E | A700 | | STA A | 00,X | ENABLE RAM WRITE |
| A060 | 86B7 | | LDA A | #0B7H | DISABLE RAM WRITE CONTROL PATTERN WITH TX ON |
| A062 | A700 | | STA A | 00,X | DISABLE RAM |
| A064 | 39 | | RTS | | RETURN |

SUBROUTINE TO DETECT READY (RAM WRITE COMPLETE)

| A065 | 86FF | DETRDY | LDA A | #0FFH | TEST PARAMETER |
|---|---|---|---|---|---|
| A067 | 97F4 | | STA A | 0F4H | TEMP STORE |
| A069 | 7A00F4 | DETMOR | DEC | 0F4H | DECREMENT TEMP STORE |
| A06C | 2603 | | BNE | XERER | DETECT ERROR ESCAPE POINTED TO DETER |
| A06E | 7EA5BA | | JMP | DETER | DETECT ERROR EXIT |
| A071 | 6D01 | XERER | TST | 02,X | TEST 4005 BIT 7 AND SET N IF CLEAR |
| A073 | 2AF4 | | BPL | DETMOR | BRANCH TO DETRDY IF N CLEAR |
| A075 | A600 | | LDA A | 00,X | THIS READ 4004 CLEARS BIT 7 |
| A077 | 39 | | RTS | | RETURN |

SUBROUTINE TO INITIALIZE CONTROL AND DATA RAMS
END ADDRESS SET TO 4C

| A078 | BDA000 > | INRAM | JSR | INITCO | INITIALIZE PIA CONTROLS WITH UW DET OFF |
|---|---|---|---|---|---|
| A07B | BDA01C > | | JSR | INITDO | INITIALIZE PIA DATA OUT |
| A07E | 8600 | | LDA A | #000H | RAM INITIALIZATION PATTERN |
| A080 | A702 | | STA A | 02,X | PATTERN TO PIA DATA OUT |
| A082 | 86FF | | LDA A | #0FFH | RAM INITIALIZATION ADDRESS |
| A084 | 97FD | | STA A | 0FDH | INITIAL ADDRESS STORED IN "FD" |
| A086 | BDA027 > | | JSR | WMLTCH | LOAD ADDRESS LATCH |

-continued

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

| Addr | Code | Label | Op | Operand | Comment |
|------|------|-------|-----|---------|---------|
| A089 | BDA053 > | | JSR | WDRAM | WRITE RAM DATA TO INITIALIZE |
| A08C | BDA065 > | | JSR | DETRDY | DETECT RDY TO INITIALIZE |
| A08F | 86FF | | LDA A | #0FFH | RAM INITIAL ADDRESS |
| A091 | 97FD | | STA A | 0FDH | INITIAL ADDRESS STORED IN "FD" |
| A093 | BDA027 > | JINC | JSR | WMLTCH | LOAD ADDRESS LATCH |
| A096 | 8600 | | LDA A | #000H | RAM INITIALIZATION PATTERN |
| A098 | A702 | | STA A | 02,X | PATTERN TO PIA OUT |
| A09A | BDA041 > | | JSR | WCRAM | ENABLE CONTROL RAM WRITE |
| A09D | BDA065 > | | JSR | DETRDY | DET RDY |
| A0A0 | BDA04R > | | JSR | WCRX | ENABLE TX CONTROL RAM WRITE |
| A0A3 | BDA065 > | | JSR | DETRDY | DET READY |
| A0A6 | BDA053 > | | JSR | WDRAM | ENABLE DATA RAM WRITE |
| A0A9 | BDA065 > | | JSR | DETRDY | DETECT READY |
| A0AC | BDA05C > | | JSR | WDRX | ENABLE TX DATA RAM WRITE |
| A0AF | BDA065 > | | JSR | DETRDY | DET READY |
| A0B2 | 7A00FD | | DEC | 0FDH | DECREMENT "FD" |
| A0B5 | 864C | | LDA A | #04CH | RAM INITIALIZE END ADDRESS |
| A0B7 | 9BFD | | ADD A | 0FDH | CALCULATE END COUNT |
| A0B9 | 26D8 | | BNE | JINC | CONTINUE TO INITIALIZE RAM UNTIL ADDRESS 00 |
| A0BB | 39 | | RTS | | RETURN |

SUBROUTINE TO WRITE TX START FINE COUNT
ENTER WITH TX COURSE IN F9 AND CONTROL PARAMETER IN "B"

| Addr | Code | Label | Op | Operand | Comment |
|------|------|-------|-----|---------|---------|
| A0BC | 96F0 | TXST | LDA A | 0F0H | FINE COUNT CONTROL RAM ADDRESS |
| A0BE | 97FD | | STA A | 0FDH | STORE IN ADDRESS LATCH BUFFER |
| A0C0 | BDA034 > | | JSR | WMLTX | WRITE RAM ADDRESS LATCH |
| A0C3 | 96F1 | | LDA A | 0F1H | LOCATION OF TRANSMIT START FINE COUNT |
| A0C5 | 8000 | | SUB A | #00H | BIAS ERROR |
| A0C7 | A702 | | STA A | 02,X | WRITE PIA DATA OUT |
| A0C9 | BDA05C > | | JSR | WDRX | WRITE DATA RAM |
| A0CC | BDA065 > | | JSR | DETRDY | DETECT READY |
| A0CF | 39 | | RTS | | RETURN |

SUBROUTINE TO WRITE TX START COURSE COUNT
ENTER WITH COURSE ADDRESS IN F0 AND CONTROL IN "B"

| Addr | Code | Label | Op | Operand | Comment |
|------|------|-------|-----|---------|---------|
| A0D0 | 96F0 | TXSTC | LDA A | 0F0H | LOCATION OF TX START COURSE ADDRESS |
| A0D2 | 97FD | | STA A | 0FDH | STORE IN ADDRESS LATCH BUFFER |
| A0D4 | BDA034 > | | JSR | WMLTX | WRITE RAM ADDRESS LATCH |
| A0D7 | 8601 | | LDA A | #01H | TX COURSE CONTROL PARAMETER |
| A0D9 | A702 | | STA A | 02,X | WRITE PIA DATA OUT |
| A0DB | BDA04R > | | JSR | WCRX | WRITE CONTROL RAM |
| A0DE | BDA065 > | | JSR | DETRDY | DET RDY |
| A0E1 | 39 | | RTS | | RETURN |

SUBROUTINE TO WRITE TX STOP
ENTER WITH PREVIOUS COURSE IN F0 FINE IN F8 AND CONTROL IN FB
EXIT WITH FB UPDATED WITH B AND F8 WITH F9

| Addr | Code | Label | Op | Operand | Comment |
|------|------|-------|-----|---------|---------|
| A0E2 | 96F0 | TXOFF | LDA A | 0F0H | LOAD PREVIOUS TX ADDRESS |
| A0E4 | 97FD | | STA A | 0FDH | STORE IN ADDRESS LATCH BUFFER |
| A0E6 | BDA034 > | | JSR | WMLTX | WRITE RAM ADDRESS LATCH |
| A0E9 | 8600 | | LDA A | #00H | TX FINE AND COURSE OFF PARAMETER |
| A0EB | A702 | | STA A | 02,X | WRITE PIA DATA OUT |
| A0ED | BDA04R > | | JSR | WCRX | WRITE CONTROL RAM |
| A0F0 | BDA065 > | | JSR | DETRDY | DETECT READY |
| A0F3 | 39 | | RTS | | RETURN |

SUBROUTINE TO WRITE AP START FINE COUNT

| Addr | Code | Label | Op | Operand | Comment |
|------|------|-------|-----|---------|---------|
| A0F4 | BDA01C > | APSTF | JSR | INITDO | REINITIALIZE PIA FOR DATA OUT |
| A0F7 | 96F2 | | LDA A | 0F2H | LOCATION OF AP START COURSE ADDRESS |

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

| Addr | Code | Label | Op | Operand | Comment |
|---|---|---|---|---|---|
| A0F9 | 97FD | | STA A | 0FDH | STORE IN ADDRESS LATCH BUFFER |
| A0FB | BDA027 > | | JSR | WMLTCH | WRITE RAM ADDRESS LATCH |
| A0FE | 96F3 | | LDA A | 0F3H | LOCATION OF AP START FINE COUNT |
| A100 | A702 | | STA A | 02,X | WRITE PIA DATA OUT |
| A102 | BDA053 > | JFR | WDRAM | | WRITE DATA RAM |
| A105 | BDA065 > | | JSR | DETRDY | DETECT READY |
| A108 | 39 | | RTS | | RETURN |

SUBROUTINE TO WRITE AP START COURSE COUNT

| Addr | Code | Label | Op | Operand | Comment |
|---|---|---|---|---|---|
| A109 | 96F2 | APSTC | LDA A | 0F2H | LOCATION OF AP START COURSE ADDRESS |
| A10B | 97FD | | STA A | 0FDH | STORE IN ADDRESS LATCH BUFFER |
| A10D | BDA027 > | | JSR | WMLTCH | WRITE RAM ADDRESS LATCH |
| A110 | 8642 | | LDA A | #42H | AP START CONTROL PATTERN "0000 0010" |
| A112 | A702 | | STA A | 02,X | WRITE PIA DATA OUT |
| A114 | BDA041 > | | JSR | WCRAM | WRITE CONTROL RAM |
| A117 | BDA065 > | | JSR | DETRDY | DETET READY |
| A11A | 39 | | RTS | | RETURN |

SUBROUTINE TO WRITE COURSE AP WITH ML CONTROL

| Addr | Code | Label | Op | Operand | Comment |
|---|---|---|---|---|---|
| A11B | 96F2 | APSTCM | LDA A | 0F2H | AP START COURSE COUNT |
| A11D | 97FD | | STA A | 0FDH | STORE IN AL BUFFER |
| A11F | BDA027 > | | JSR | WMLTCH | WRITE AL |
| A122 | 8606 | | LDA A | #06H | AP START WITH ML CONTROL PATTERN |
| A124 | A702 | | STA A | 02,X | PIA DATA OUTPUT |
| A126 | BDA041 > | | JSR | WCRAM | WRITE CONTROL RAM |
| A129 | BDA065 > | | JSR | DETRDY | DETECT READY |
| A12C | 39 | | RTS | | RETURN |

SUBROUTINE TO GENERATE DELAY

| Addr | Code | Label | Op | Operand | Comment |
|---|---|---|---|---|---|
| A12D | 8655 | DELAY | LDA A | #055H | DELAY PARAMETER 1 |
| A12F | 97F5 | | STA A | 0F5H | TEMP STORE 1 |
| A131 | 96FF | OVER2 | LDA A | 0FFH | DELAY PARAMETER 2 |
| A133 | 97F4 | | STA A | 0F4H | TEMP STORAGE 2 |
| A135 | 7A00F4 | OVER1 | DEC | 0F4H | DECREMENT 1 |
| A138 | 26FB | | BNE | OVER1 | REPEAT 1 |
| A13A | 7A00F5 | | DEC | 0F5H | DECREMENT 2 |
| A13D | 26F2 | | BNE | OVER2 | REPEAT 2 |
| A13F | 39 | | RTS | | RETURN |

SUBROUTINE TO GENERATE FRAME DELAY

| Addr | Code | Label | Op | Operand | Comment |
|---|---|---|---|---|---|
| A140 | 8603 | FDELAY | LDA A | #003H | DELAY PARAMETER |
| A142 | 97F5 | | STA A | 0F5H | TEMP STORE |
| A144 | 7A00F5 | OVERF | DEC | 0F5H | DECREMENT STORE |
| A137 | 26FB | | BNE | OVERF | TEST AND REPEAT |
| A149 | 39 | | RTS | | RETURN |

SUBROUTINE TO INITIALIZE PIA B SIDE FOR INPUT (DATA)

| Addr | Code | Label | Op | Operand | Comment |
|---|---|---|---|---|---|
| A14A | 6F03 | INITDI | CLR | 03,X | SELECT DATA DIRECTION REG |
| A14C | 6F02 | | CLR | 02,X | SET REG B AS INPUT |
| A14E | 8604 | | LDA A | #04H | DATA REG SELECTION PARAMETER |
| A150 | A703 | | STA A | 03,X | SELECT DATA REG |
| A152 | 39 | | RTS | | RETURN |

SUBROUTINE TO INITIALIZE PIA B SIDE FOR INPUT WITH TX ON

| Addr | Code | Label | Op | Operand | Comment |
|---|---|---|---|---|---|
| A153 | 6F03 | INDITX | CLR | 03,X | SELECT DATA DIRECTION REG |
| A155 | 6F02 | | CLR | 02,X | SET INPUT DIRECTION |
| A157 | 8604 | | LDA A | #04H | SELECT DATA REG PARAMETER |
| A159 | A703 | | STA A | 03,X | SELECT DATA REG |
| A15B | 39 | | RTS | | RETURN |

SUBROUTINE TO INITIALIZE PIA B SIDE FOR OUTPUT WITH TX ON

| Addr | Code | Label | Op | Operand | Comment |
|---|---|---|---|---|---|
| A15C | 6F03 | INDOTX | CLR | 03,X | SELECT DATA DIRECTION REG |
| A15E | 86FF | | LDA A | #0FFH | OUTPUT DIRECTION PARAMETER |
| A160 | A702 | | STA A | 02,X | SELECT OUTPUT DIRECTION |
| A162 | 8604 | | LDA A | #04H | SELECT DATA REG PARAMETER |
| A164 | A703 | | STA A | 03,X | SELECT DATA REG |
| A166 | 39 | | RTS | | RETURN |

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

SUBROUTINE TO READ MEASUREMENT LATCHCENTER WITH RML PARAMETER IN "A"

| | | | | | |
|---|---|---|---|---|---|
| A167 | 7F00F6 | RML | CLR | 0F6H | CLEAR ML COURSE BUFFER |
| A16A | 7F00F7 | | CLR | 0F7H | CLEAR ML FINE BUFFER |
| A16D | A700 | | STA A | 00,X | ENABLE ML WRITE |
| A16F | BDA153 > | | JSR | INDITX | INITIALIZE PIA FOR INPUT WITH TX ON |
| A172 | BDA140 > | | JSR | FDELAY | FRAME DELAY |
| A175 | 8696 | | LDA A | #96H | FINE OUTPUT ENABLE PATTERN |
| A177 | A700 | | STA A | 00,X | ENABLE MEASUREMENT LATCH FINE OUTPUT |
| A179 | A602 | | LDA A | 02,X | READ MEASUREMENT LATCH FINE OUTPUT |
| A17B | 4R | | DEC A | | COMPENSATE FOR COURSE OFFSET |
| A17C | 97F7 | | STA A | 0F7H | STORE IN FINE COUNT BUFFER |
| A17E | 8B33 | | ADD A | #033H | SETUP TEST FOR CE |
| A180 | 2604 | | BNE | ADJUST | TEST AND BRANCH IF NOT CE |
| A182 | 86FF | | LDA A | #0FFH | CORRECTION FOR CE |
| A184 | 97F7 | | STA A | 0F7H | STORE IN FINE COUNT BUFFER |
| A186 | 8697 | ADJUST | LDA A | #97H | COURSE OUTPUT ENABLE PATTERN |
| A188 | A700 | | STA A | 00,X | ENABLE MEASUREMENT LATCH COURSE OUTPUT |
| A18A | A602 | | LDA A | 02,X | READ MEASUREMENT LATCH COURSE OUTPUT |
| A18C | 97F6 | | STA A | 0F6H | STORE IN COURSE COUNT BUFFER |
| A18E | 86B7 | | LDA A | #0B7H | DISABLE MEASUREMENT LATCH PATTERN |
| A190 | A700 | | STA A | 00,X | DISABLE MEASUREMENT LATCH |
| A192 | BDA15C > | | JSR | INDOTX | INITIALIZE PIA FOR DATA OUTPUT |

VERIFY MEASUREMENT

| | | | | | |
|---|---|---|---|---|---|
| A195 | 96F6 | | LDA A | 0F6H | TX COURSE MEAS |
| A197 | 2701 | | BEQ | TXFAIL | TEST FOR LOCAL RX |
| A199 | 39 | | RTS | | RETURN |

TURN TX OFF

| | | | | | |
|---|---|---|---|---|---|
| A91A | 86B5 | TXFAIL | LDA A | #0B5H | TX OFF PARAMETER |
| A19C | A700 | | STA A | 00,X | TX OFF |
| A19E | 7EA5BA | | JMP | MEAER | TX TIMING MEASUREMENT LOSS ERROR ESCAPE |

SUBROUTINE TO ACQUIRE FRAME REFERENCE TIMING

| | | | | | |
|---|---|---|---|---|---|
| A1A1 | BDA000 > | AFRT | JSR | INITCO | REINITIALIZE PIA A SIDE (CONTROL) FOR UW DET OFF |
| A1A4 | 86FF | | LDA A | #0FFH | INITIAL COURSE ADDRESS |
| A1A6 | 97FD | | STA A | 0FDH | MEMORY LATCH ADDRESS BUFFER |
| A1A8 | BDA01C > | | JSR | INITDO | INITIALIZE PIA FOR DATA OUTPUT |
| A1AB | BDA027 > | AGAIN2 | JSR | WMLTCH | WRITE MEMORY LATCH |
| A1AE | 861A | | LDA A | #1AH | COUNTER UW PRESET ENABLE PATTERN |
| A1B0 | A702 | | STA A | 02,X | OUTPUT PIA DATA |
| A1B2 | BDA041 > | | JSR | WCRAM | WRITE CONTROL RAM |
| A1B5 | BDA065 > | | JSR | DETRDY | DETECT READY |
| A1B8 | 7A00FD | | DEC | 0FDH | DECREMENT (FD) |
| A1BB | 864C | | LDA A | #04CH | RAM END ADDRESS |
| A1BD | 9BFD | | ADD A | 0FDH | CALCULATE END ADDRESS |
| A1BF | 26EA | | BNE | AGAIN2 | OPEN COUNTER PRESET |
| A1C1 | BDA00E > | | JSR | INITC | REINITIALIZE PIA FOR UW DET ON |
| A1C4 | BDA140 > | | JSR | FDELAY | WAIT FOR ONE FRAME |
| A1C7 | BDA000 > | | JSR | INITCO | REINITIALIZE PIA FOR UW DET OFF |
| A1CA | 8600 | | LDA A | #000H | LOAD TEMP STORE (AP 2 WIDE) |
| A1CC | 97FD | | STA A | 0FDH | MEMORY LATCH ADDRESS BUFFER |
| A1CE | 7A00FD | GOTYA | DEC | 0FDH | NOTCH OUT REF AP |
| A1D1 | BDA027 > | AGAIN3 | JSR | WMLTCH | WRITE MEMORY ADDRESS LATCH |

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

| | | | | | |
|---|---|---|---|---|---|
| A1D4 | 8600 | | LDA A | #00H | COUNTER UW PRESET DISABLE PATTERN |
| A1D6 | A702 | | STA A | 02,X | OUTPUT PIA DATA |
| A1D8 | BDA041 > | | JSR | WCRAM | WRITE CONTROL RAM |
| A1DB | BDA065 > | | JSR | DETRDY | DETECT READY |
| A1DE | 7A00FD | | DEC | 0FDH | DECREMENT (FD) |
| A1E1 | 8602 | | LDA A | #02H | REF AP ADDRESS |
| A1E3 | 9BFD | | ADD A | 0FDH | CAL REF ADDRESS |
| A1E5 | 27E7 | | BEQ | GOTYA | NOTCH OUT REF AP |
| A1E7 | 864C | | LDA A | #04CH | RAM END ADDRESS |
| A1E9 | 9BFD | | ADD A | 0FDH | CALCULATE END ADDRESS |
| A1EB | 26E4 | | BNE | AGAIN3 | CLOSE UW COUNTER PRESET |
| A1ED | BDA00E > | | JSR | INITC | REINITIALIZE PIA FOR UW DET ON |

CLOSE UW AP

| | | | | | |
|---|---|---|---|---|---|
| A1F0 | 86F3 | | LDA A | #0F3H | FINE COUNT LOCATION OF UW AP |
| A1F2 | 97F3 | | STA A | 0F3H | UW AP FINE COUNT BUFFER |
| A2F4 | 86FE | | LDA A | #0FEH | COURSE COUNT LOCATION OF REF AP |
| A1F6 | 97F2 | | STA A | 0F2H | UW AP COURSE COUNT BUFFER |
| A1F8 | BDA0F4 > | | JSR | APSTF | WRITE AP FINE COUNT |
| A1FB | 86B5 | | LDA A | #0B5H | CLOSE AP PATTERN |
| A1FD | A700 | | STA A | 00,X | CLOSE AP |

READ SIC

| | | | | | |
|---|---|---|---|---|---|
| A1FF | 8604 | | LDA A | #04H | UW DETECT COUNT |
| A201 | 97F4 | | STA A | 0F4H | DUMMY COUNT |

NOTE UW AP NOW ENABLED

| | | | | | |
|---|---|---|---|---|---|
| A203 | BDA14A > | REFIT | JSR | INITDI | INITIALIZE PIA FOR DATA INPUT |
| A206 | BDA140 > | | JSR | FDELAY | WAIT ONE FRAME |
| A209 | 86A5 | | LDA A | #0A5H | SIC LATCH OE PATTERN |
| A20B | A700 | | STA A | 00,X | ENABLE SIC LATCH OUTPUT |
| A20D | A602 | | LDA A | 02,X | READ SIC LATCH |
| A20F | 97FF | | STA A | 0FFH | SIC BUFFER |
| A211 | 86B5 | | LDA A | #0B5H | SIC LATCH OUTPUT DISABLE PATTERN |
| A213 | A700 | | STA A | 00,X | DISABLE SIC LATCH OUTPUT |
| A215 | BDA01C > | | JSR | INITDO | RESTORE PIA FOR DATA OUTPUT |

NEXT COMPARE WITH REF STA SIC

| | | | | | |
|---|---|---|---|---|---|
| A218 | 96FF | | LDA A | 0FFH | LOAD SIC |
| A21A | 8B00 | | ADD A | #00H | REFERENCE STATION MASK |
| A21C | 2683 | | BNE | AFRT | TRY AGAIN IF NOT REFERENCE STATION |
| A21E | 7A00F4 | | DEC | 0F4H | DECREMENT DUMMY |
| A211 | 26E0 | | BNE | REFIT | TEST AGAIN |
| A223 | 39 | | RTS | | RETURN |

SUBROUTINE TO ACQUIRE TX TIMING

| | | | | | |
|---|---|---|---|---|---|
| A224 | 7F00F7 | ATXT | CLR | 0F7H | CLEAR MEAS LATCH BUFFER |
| A227 | 96F0 | | LDA A | 0F0H | LOAD OPEN LOOP ACQUISITION ESTIMATE |
| A229 | BDA0BC > | | JSR | TXST | WRITE TX START FINE |
| A22C | BDA0D0 > | | JSR | TXSTC | WRITE TX START COURSE |
| A22F | BDA12D > | | JSR | DELAY | WAIT R.T. DELAY |
| A232 | 863F | | LDA A | #3FH | RML PRAM WITH AP OPEN |
| A234 | BDA167 > | | JSR | RML | READ ML |
| A237 | 96F7 | | LDA A | 0F7H | READ ML FINE |
| A239 | 2603 | | BNE | GOTX | TEST FOR MEAS ERROR |
| A23B | 7EA5BA | | JMP | TXAER | TRANSMIT ACQUISITION ERROR TRAP |
| A23E | 8BF4 | GOTX | ADD A | #0F4H | BIAS ERROR |
| A240 | 90E1 | | SUB A | 0E1H | CAL ERROR |
| A242 | 40 | | NEG A | | PREPARE FOR SUBTRACTION |
| A243 | 9BF1 | | ADD A | 0F1H | CAL CORRECTION |
| A245 | 97F1 | | STA A | 0F1H | STORE IN TX FINE BUFFER |
| A247 | BDA0BC > | | JSR | TXST | WRITE TX START FINE |

-continued
LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

| | | | | | |
|---|---|---|---|---|---|
| A24A | 39 | | RTS | | RETURN |
| | | | SUBROUTINE TO UPDATE TX TIMING | | |
| | | ENTER WITH FINE AND COURSE MEAS IN F7 AND F6 | | | |
| A24B | 8697 | ADTXT | LDA A | #97H | RML PARAMETER WITH AP CLOSED |
| A24D | 7E0100 | | JMP | RMLTRP | JUMP TO RMP TRAP INSTRUCTIONS |
| A250 | BDA167 > | | JSR | RML | READ MEASUREMENT LATCH COURSE AND FINE, C=F6 F=F7 |
| | | | CALCULATE ERROR (+−3). | | |
| | | SUBTRACT MLF-DESIRED RX POSITION (DRP) | | | |
| A253 | D6F7 | | LDA B | 0F7H | LOAD FINE BUFFER |
| A255 | CBF4 | | ADD B | #0F4H | BIAS ERROR |
| A257 | 96E1 | | LDA A | 0E1H | GET DESIRED TX POSITION |
| | | | UNRAVEL TX DESIRED START TIME | | |
| A259 | 4A | | DEC A | | CORRECT FOR COURSE OFFSET |
| A25A | 81CD | | CMP A | #0CDH | TEST FOR END OF FINE COUNT |
| A25C | 2602 | | BNE | ADJ4 | ADJUST FOR END OF FINE COUNT |
| A25E | 86FF | | LDA A | #0FFH | END OF FINE COUNT |
| A260 | 97F4 | ADJ4 | STA A | 0F4H | TEMP STORE |
| A262 | D0F4 | | SUB B | 0F4H | CALCULATE ERROR |
| A264 | 2744 | | BEQ | NOCOR | RETURN IF NO ERROR |
| | | | REG B CONTAINS ERROR | | |
| | | | MAKE CORRECTION | | |
| A266 | 96F1 | ADJ1 | LDA A | 0E1H | LOAD LAST FINE TX POSITION |
| A268 | 4A | | DEC A | | CORRECT FOR COURSE OFFSET |
| A269 | 81CD | | CMP A | #0CDH | END OF FINE COUNT TEST PARAMETER |
| A26B | 2602 | | BNE | ADJ2 | BRANCH NOT = 0 |
| A26D | 86FF | | LDA A | #0FFH | CORRECT END OF FINE COUNT |
| A26F | 81FF | ADJ2 | CMP A | #0FFH | COMPARE WITH E0FC |
| A271 | 271B | | BEQ | E0FC | BRANCH TO E0FC IF Z FLAG SET |
| A273 | 81CE | | CMP A | #0CEH | COMPARE WITH B0F |
| A275 | 2754 | | BEQ | B0FC | BRANCH TO B0F |
| | | | NORMAL CORRECTION | | |
| A277 | 5D | NORCOR | TST B | | TEST FOR ERROR |
| A278 | 2E0B | | BGT | ADJ3 | BRANCH IF GREATER THAN ZERO |
| A27A | 4C | | INC A | | INCREMENT TX START |
| A27B | 4C | | INC A | | INCREMENT TO RAVEL |
| A27C | 2602 | | BNE | ADJ6 | TEST FOR END OF FINE "CE" |
| A27E | 86CE | | LDA A | #0CEH | END OF FINE COUNT |
| A280 | 97F1 | ADJ6 | STA A | 0F1H | STORE IN TR START BUFFER |
| A282 | 5C | | INC B | | INCREMENT ERROR COUNT |
| A283 | 2003 | | BRA | ADJ5 | BRANCH TO TEST ERROR COUNT |
| A285 | 97F1 | ADJ3 | STA A | 0F1H | STORE IN TX START BUFFER |
| A287 | 5A | | DEC B | | DECREMENT ERROR COUNT |
| A288 | 26DC | ADJ5 | BNE | ADJ1 | REPEAT IF ERROR NOT ZERO |
| A28A | BDA0BC > | | JSR | TXST | WRITE NEW TX FINE |
| A28D | 39 | | RTS | | RETURN |
| | | | END OF FINE COUNT | | |
| A38E | 5D | E0FC | TST B | | |
| A28F | 2EE6 | | BGT | NORCOR | IF GREATER THAN ZERO MAKE NORMAL CORRECTION |
| | | | INCREMENT TX COURSE COUNT | | |
| A291 | 96F0 | | LDA A | 0F0H | LOAD LAST COURSE COUNT |
| A293 | 81FF | | CMP A | #0FFH | TEST FOR END OF FRAME |
| A295 | 271D | | BEQ | E0CC | |
| | | | NORMAL COURSE COUNT INCREMENT | | |
| A297 | 86CF | | LDA A | #0CFH | BEGINNING OF FINE COUNT (RAVELED) |

LOW COST TDMA OPERATING PROGRAM
THIS PROGRAM GENERATES THE CONTROLS AND PERFORMS
THE CALCULATIONS NECESSARY FOR OPERATING
THE 6800 MPU BASED LOW COST TDMA TERMINAL

| Addr | Code | Label | Op | Operand | Comment |
|---|---|---|---|---|---|
| A299 | 97F1 | | STA A | 0F1H | TX FINE BUFFER |
| A29B | 7C00F0 | | INC | 0F0H | INCREMENT COURSE BUFFER |
| A29E | BDA2AB > | | JSR | CGTXTM | CHANGE TX TIMING |
| A2A1 | 7A00F0 | | DEC | 0F0H | LAST TX COURSE |
| A2A4 | BDA0E2 > | | JSR | TXOFF | LAST TX OFF |
| A2A7 | 7C00F0 | | INC | 0F0H | RESTORE F0 |
| A2AA | 39 | NOCOR | RTS | | RETURN |
| A2AB | 96J0 | CGTXTM | LDA A | 0F0H | NEW COURSE COUNT |
| A2AD | BDA0BC > | | JSR | TXST | WRITE TX ST FINE |
| A2B0 | BDA0D0 > | | JSR | TXSTC | WRITE TX START COURSE |
| A2B3 | 39 | | RTS | | RETURN |

END OF FRAME CORRECTION

| Addr | Code | Label | Op | Operand | Comment |
|---|---|---|---|---|---|
| A2B4 | 86B5 | EOCC | LDA A | #0B5H | B0F COURSE COUNT |
| A2B6 | 97F0 | | STA A | 0F0H | TX COURSE BUFFER |
| A2B8 | 86CF | | LDA A | #0CFH | B0F FINE COUNT |
| A2BA | 97F1 | | STA A | 0F1H | TX FINE BUFFER |
| A2BC | BDA2AB > | | JSR | CGTXTM | CHANGE TX TIMING |
| A2BF | 86FF | | LDA A | #0FFH | LAST COURSE COUNT |
| A2C1 | 97F0 | | STA A | 0F0H | TX OFF WORKING REG |
| A2C3 | BDA0E2 > | | JSR | TXOFF | LAST TX OFF |
| A2C6 | 86B5 | | LDA A | #0B5H | TX COURSE COUNT TEMP |
| A2C8 | 97F0 | | STA A | 0F0H | RESTORE TX COURSE COUNT BUFFER |
| A2CA | 39 | | RTS | | RETURN |

BEGINNING OF FINE COUNT

| Addr | Code | Label | Op | Operand | Comment |
|---|---|---|---|---|---|
| A2CB | 5D | B0FC | TST B | | |
| A2CC | 2DA9 | | BLT | NORCOR | IF LESS THAN ZERO MAKE NORMAL CORRECTION |

DECREMENT TX COURSE COUNT

| Addr | Code | Label | Op | Operand | Comment |
|---|---|---|---|---|---|
| A2CE | 96F0 | | LDA A | 0F0H | LOAD LAST COURSE COUNT |
| A2D0 | 81B5 | | CMP A | #0B5H | TEST BEGINNING OF FRAME |
| A2D2 | 2714 | | BEQ | B0CC | |

NORMAL COURSE COUNT DECREMENT

| Addr | Code | Label | Op | Operand | Comment |
|---|---|---|---|---|---|
| A2D4 | 86CE | | LD A | #0CEH | END OF FIND COUNT |
| A2D6 | 97F1 | | STA A | 0F1H | FINE COUNT BUFFER |
| A2D8 | 7A00F0 | | DEC | 0F0H | DECREMENT COURSE BUFFER |
| A2DB | BDA2AB > | | JSR | CGTXTM | CHANGE TX TIMING |
| A2DE | 7C00F0 | | INC | 0F0H | LAST TX COURSE |
| A2E1 | BDA0E2 > | | JSR | TXOFF | LAST TX OFF |
| A2E4 | 7A00F0 | | DEC | 0F0H | RESTORE F0 |
| A2E7 | 39 | | RTS | | RETURN |

BEGINNING OF FRAME CORRECTION

| Addr | Code | Label | Op | Operand | Comment |
|---|---|---|---|---|---|
| A2E8 | 86FF | B0CC | LDA A | #0FFH | EOF COURSE COUNT |
| A2EA | 97F0 | | STA A | 0F0H | TX COURSE BUFFER |
| A2EC | 86FF | | LDA A | #0FFH | EOF FINE COUNT |
| A2EE | 97F1 | | STA A | 0F1H | TX FINE BUFFER |
| A2F0 | BDA2AB > | | JSR | CGTXTM | CHANGE TX TIMING |
| A2F3 | 86B5 | | LDA A | #0B5H | B0F COURSE |
| A2F5 | 97F0 | | STA A | 0F0H | TX OFF WORKING REG |
| A2F7 | BDA0E2 > | | JSR | TXOFF | LAST TX OFF |
| A2FA | 86FF | | LDA A | #0FFH | CURRENT TX COURSE |
| A2FC | 97F0 | | STA A | 0F0H | REINSTATE TX COURSE BUFFER |
| A2FE | 39 | | RTS | | RETURN |

MAIN PROGRAM
LOAD RAM CONSTANTS
SET RML TRAP INSTRUCTIONS

| Addr | Code | Label | Op | Operand | Comment |
|---|---|---|---|---|---|
| A2FF | 867E | MAIN | LDA A | #07EH | JMP OP CODE |
| A301 | B70100 | | STA A | RMLTP1 | STORE IN 101 |
| A304 | 86A2 | | LDA A | #0A2H | TRAP RETURN ADDRES COURSE |
| A306 | B70101 | | STA A | RMLTP2 | STORE IN 102 |
| A309 | 8650 | | LDA A | #050H | TRAP RETURN ADDRESS FINE |
| A30B | B70102 | | STA A | RMLTP3 | STORE IN 103 |

LOCAL AP

| Addr | Code | Label | Op | Operand |
|---|---|---|---|---|
| A30E | 86E7 | | LDA A | #0D6H |
| A310 | 96E0 | | STA A | 0E0H |
| A312 | 86E3 | | LDA A | #0E8H |
| A314 | 97E1 | | STA A | 0E1H |

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

```
                              DATA AP
A316   86D6            LDA A   #0E7H
A318   97E2            STA A   0E2H
A31A   86E8            LDA A   #0E3H
A31C   97E3            STA A   0E3H
A31E   86D6            LDA A   #0E7H
A320   97E4            STA A   0E4H
A322   86E8            LDA A   #0E3H
A324   97E5            STA A   0E5H

AP COUNT
A326   8600            LDA A   #00H
A328   97EE            STA A   0EEH
A32A   8602            LDA A   #02H
A32C   97EF            STA A   0EFH

TX START
A32E   86D6            LDA A   #0D6H
A330   97D0            STA A   0D0H
A332   86E7            LDA A   E0E7H
A334   97D1            STA A   0D1H

TX OPEN LOOP NOMINAL START
A336   86E6            LDA A   #0D5H
A338   97F0            STA A   0F0H
A33A   86ED            LDA A   #0E2H
A330C  97F1            STA A   0F1H
A33E   8E0050   BEGIN  LDS     #050H        LOAD STACK POINTER
A341   CE2004          LDX     #2004H       LOAD INDEX REGISTER
A344   BDA078 >        JSR     INRAM        INITIALIZE RAM
A347   BDA1A1 >        JSR     AFRT         ACQUIRE FRAME REFERENCE
                                            TIMING

SET AP BUFFERS
                            LOCAL AP
A34A   96E0            LDA A   0E0H
A34C   97F2            STA A   0F2H         AP COURSE BUFFER
A34E   96E1            LDA A   0E1H
A350   97F3            STA A   0F3H
A352   BDA0F4 >        JSR     APSTF        WRITE AP FINE CONTROLS
A355   BDA11B >        JSR     APSTCM       WRITE AP COURSE CONTROLS

DATA AP
A358   96E2            LDA A   0E2H
A35A   97F2            STA A   0F2H         AP COURSE BUFFER
A35C   96E3            LDA A   0E3H
A35E   97F3            STA A   0F3H         AP FINE BUFFER
A360   BDA0F4 >        JSR     APSTF        WRITE FINE AP
A363   BDA109 >        JSR     APSTC        WRITE COURSE AP
A366   96E4            LDA A   0E4H
A368   97F2            STA A   0F2H         AP COURSE BUFFER
A36A   96E5            LDA A   0E5H
A36C   97F3            STA A   0F3H         AP FINE BUFFER
A36E   BDA0F4 >        JSR     APSTF        WRITE FINE AT
A371   BDA109 >        JSR     APSTC        WRITE COURSE AP
A374   86B5            LDA A   #0B5H        CLOSE AP PATTERN
A376   A700            STA A   00,X         CLOSE AP

OPERATING PROGRAM
A378   BDA224 >        JSR     ATXT         ACQUIRE TX TIMING
A37B   BDA248 > SSSYNC JSR     ADTXT        ADJUST TX TIMING
A37E   B62008          LDA A   2008H
A381   47              ASR A
A382   24F7            BCC     SSSYNC
A384   7E85BA          JMP     TTYT         TTY TEST
A387   7EA37B >        JMP     SSSYNC       STEADY STATE OPERATION
       A2FF >          END     MAIN         MAIN PROG POINTER
```

| SCALARS | | | | | | | | |
|---|---|---|---|---|---|---|---|---|
| DETER | A5BA | MEAER | A5BA | REFER | A5BA | RMLTP1 | 0100 | RMLTP2 | 0101 |
| RMLTP3 | 0102 | RMLTRP | 0100 | TTYT | A5BA | TXAER | A5BA | | |
| XOTEMPO (DEFAULT SECTION (A38A)) | | | | | | | | |
| ADJ1 | A266 | ADJ2 | A26F | ADJ3 | A285 | ADJ4 | A260 | ADJ5 | A288 |
| ADJ6 | A280 | ADJUST | A186 | ADTXT | A24B | AFRT | A1A1 | AGAIN2 | A1AB |
| AGAIN3 | A1D1 | APSTC | A109 | APSTCM | A11B | APSTF | A0F4 | ATXT | A224 |
| BEGIN | A33E | BOCC | A2E8 | BOFC | A2CB | CGTXTM | A2AB | DELAY | A12D |
| DETMOR | A069 | DETRDY | A065 | EOCC | A2B4 | EOFC | A28E | FDELAY | A140 |

LOW COST TDMA OPERATING PROGRAM
THIS PROGRAM GENERATES THE CONTROLS AND PERFORMS THE CALCULATIONS NECESSARY FOR OPERATING THE 6800 MPU BASED LOW COST TDMA TERMINAL

| GOTX | A23E | GOTYA | A1CE | INDITX | A153 | INDOTX | A15C | INITC | A00E |
|---|---|---|---|---|---|---|---|---|---|
| INITCO | A000 | INITDI | A14A | INITDO | A01C | INRAM | A078 | JINC | A093 |
| MAIN | A2FF | NOCOR | A2AA | NORCOR | A277 | OVER1 | A135 | OVER2 | A131 |
| OVERF | A144 | REFIT | A203 | RML | A167 | SSSYNC | A37B | TXFAIL | A19A |
| TXOFF | A0E2 | TXST | A0BC | TXSTC | A0D0 | WCRAM | A041 | WCRX | A04A |
| WDRAM | A053 | WDRX | A05C | WMLTCH | A027 | WMLTX | A034 | XERER | A071 |

632 SOURCE LINES  632 ASSEMBLED LINES  30257 BYTES AVAILABLE

What is claimed is:

1. In a time division multiple access (TDMA) terminal operable between at least a terrestrial interface module (TIM) and a modem, a microprogrammable TDMA terminal controller comprising:
a microprogrammed random access memory (RAM) controller means for generating control signals to effect burst processing and data path control functions;
computer means for monitoring the operation of said terminal and providing data and control signals to said terminal to maintain desired terminal operation;
transmit means responsive to control signals from both said RAM controller and said computer for receiving data from said TIM, forming said data into a TDMA transmit burst and forwarding said burst to said modem;
receive means responsive to control signals from both said RAM controller and said computer for receiving demodulated bursts from said modem, deriving received data from said demodulated bursts and forwarding said data to said TIM; and
clock means for providing a source of timing pulses to said terminal controller.

2. A microprogrammable TDMA terminal controller as defined in claim 1, wherein said RAM controller includes symbol counting means for counting said timing pulses and providing an output representing the value in said counting means, the most significant bits of said symbol counting means output comprising a coarse count value for determining a coarse interval during which a control signal is to be generated by said RAM controller, and the least significant bits of said symbol counting means comprising a fine count value for determining the time during said coarse interval at which the control signal is to be generated by said RAM controller.

3. A microprogrammable TDMA terminal controller as defined in claim 2, wherein said symbol counting means is a split frame symbol counter, comprising:
a fine symbol counter for counting said clock pulses; and
a coarse symbol counter for counting carryover pulses from said fine symbol counter.

4. A microprogrammable TDMA terminal controller as defined in claims 2 or 3, wherein said timing pulses occur at the symbol rate and said counting means is preset once during each frame period.

5. A microprogrammable TDMA terminal controller as defined in claim 2, wherein said RAM controller comprises:
a control RAM which, in response to a read signal, provides output control data in accordance with an address input signal; and
address means for providing said read signal to said control RAM in response to a particular coarse count value in said counting means.

6. A microprogrammable TDMA terminal controller as defined in claim 5, wherein said address input signal is provided by the coarse count value in said symbol counting means.

7. A microprogrammable TDMA terminal controller as defined in claim 6, wherein said address means also provides a write signal, and wherein said control RAM includes a data input terminal for receiving input data and, in response to said write signal provided by said address means, writes said input data at a memory location specified by the address input signal received from said symbol counting means.

8. A microprogrammable TDMA terminal controller as defined in claim 7, wherein said address means comprises:
address latch means controlled by said computer means for storing an address value received from said computer means; and
an address comparator which receives said coarse count value and the address value stored in said address latch as its two input signals and provides said read or write signal in response to coincidence between said two address comparator input signals.

9. A microprogrammable TDMA terminal controller as defined in claims 7 or 8, wherein said RAM controller further comprises:
means for providing a measurement latch signal derived from a demodulated received burst; and
measurement latch means responsive to said measurement latch signal for receiving and storing the value in said symbol counting means;
said computer means monitoring the contents of said measurement latch means in order to detect a timing error in the operation of said terminal and, when such a timing error is detected, reprogramming said microprogrammed RAM controller to correct said timing error.

10. A microprogrammable TDMA terminal controller as defined in claim 9, wherein the output control data provided at the output of said control RAM includes a fine count control value representing the time during a corresponding coarse interval at which a fine control signal is to be generated, said RAM controller further comprising means for generating a fine control signal in response to a coincidence between said fine count control value and said fine count value in said symbol counting means, and wherein said computer means, in response to a detected timing error, provides a new fine count value to the data input terminal of said control RAM and provides a corresponding address to said address latch, whereby said control RAM is automatically reprogrammed when the coarse count in said symbol counter arrives at the address value loaded into said address latch.

11. A microprogrammable TDMA terminal controller as defined in claim 9, wherein said receive means includes a unique word detection means for detecting a unique word within a demodulated received burst, said measurement latch signal being provided in response to an output from said unique word detection means.

12. A microprogrammable TDMA terminal controller as defined in claim 6, wherein the output control data provided at the output of said control RAM includes a fine count control value representing the time during a corresponding coarse interval at which a fine control signal is to be generated, said RAM controller further comprising means for generating a fine control signal in response to a coincidence between said fine count control value and said fine count value in said symbol counting means.

13. A microprogrammable TDMA terminal controller as defined in claim 12, wherein said means for generating comprises:
  event latch means for receiving and storing the fine count control value provided at the output of said control RAM; and
  event comparator means for receiving as its two inputs the fine count value in said symbol counter and the fine count control value in said event latch means, and providing a fine control signal in response to coincidence between its two input signals.

14. A microprogrammable TDMA terminal controller as defined in claim 13, wherein said event latch means comprises:
  a transmit event latch for receiving and storing a fine count control value from said control RAM indicating the time during a coarse interval at which a transmission function is to be performed;
  a transmit event comparator for providing a fine control signal in response to coicidence between the contents of said transmit event latch and the fine count value in said symbol counting means;
  a receive event latch for receiving and storing a fine count control value from said control RAM indicating the time during a coarse interval at which a receive function is to be performed, and
  a receive event comparator for providing a fine control signal in response to detected coincidence between the contents of said receive event latch and the fine count value in said symbol counting means.

15. A microprogrammable TDMA terminal controller as defined in claim 13, wherein the output control signals from said control RAM in response to an address signal include a coarse enabling signal, said means for generating further comprising gate means being enabled by said coarse enabling signal and, when enabled, passing the fine control signal from the output of said comparator.

16. A microprogrammable TDMA terminal controller as defined in claim 13, wherein said receive means includes a receive burst symbol counter for counting the symbols in a demodulated receive burst, said means for generating further comprising:
  a further receive event latch for receiving and storing the fine count control value at the output of said control RAM; and
  a further receive event comparator for receiving as one input the output of said further receive event latch and as its other input the value in said receive burst symbol counter, said further receive event comparator providing a fine count control signal in response to coincidence between its two input signals.

17. A microprogrammable TDMA terminal controller as defined in claim 16, wherein said receive event comparator provides an output signal for use in intraburst control and the output from said further receive event comparator is useful in receive inter-burst control.

18. A microprogrammable TDMA terminal controller as defined in claims 1 or 13, wherein said control signals generated by said RAM controller include fine control signals, said transmit means comprising:
  means for receiving data from said TIM;
  transmit burst symbol counting means enabled by a fine control signal from said RAM controller for counting said timing pulses and providing an output;
  a transmit programmable read only memory (PROM) receiving as its address signal the output from said transmit burst symbol counting means for providing transmit burst timing control signals;
  preamble means responsive to control signals from said computer means and responsive to timing control signals from said transmit PROM for adding variable preamble information to said data; and
  transmit output means for receiving and combining said preamble information and said transmit data.

19. A microprogrammable TDMA terminal controller as defined in claim 18, wherein said transmit PROM also provides fixed preamble information in response to said address signal, said fixed preamble information being received and combined in said transmit output means.

20. A microprogrammable TDMA terminal controller as defined in claim 18, wherein said preamble means includes a scrambler for scrambling the transmit data received from said TIM.

21. A microprogrammable TDMA terminal controller as defined in claim 18, wherein said preamble means includes means for generating common signalling channel (CSC) information.

22. A microprogrammable TDMA terminal controller as defined in claim 21, wherein said means for generating CSC information comprises:
  a transmit CSC latch for receiving and storing CSC information provided by said computer means; and
  CSC transmit shift register means for receiving and storing said CSC information from said transmit CSC latch in response to a timing control signal from said transmit PROM, and for shifting out said CSC information in response to said timing pulses.

23. A microprogrammable TDMA terminal controller as defined in claim 18, wherein said preamble means includes means for generating order wire (OW) information.

24. A microprogrammable TDMA terminal controller as defined in claim 23, wherein said means for generating OW information comprises:
  a transmit OW latch for receiving and storing OW information provided by said computer means; and
  transmit OW shift register means for receiving and storing the contents of said transmit OW latch in response to a timing control signal from said transmit PROM and for shifting out said OW information in response to said timing pulses.

25. A microprogrammable TDMA terminal controller as defined in claim 18, wherein said transmit burst symbol counting means comprises:
- a transmit burst symbol counter having a clear input terminal, a clock input terminal, a count value output terminal and a carryover output terminal, said transmit burst symbol counter counter being continuously incremented in response to timing pulses received at said clock input terminal and providing at its count value output terminal a signal corresponding to the present value in said transmit burst symbol counter, said transmit burst symbol counter providing a carryover output signal when the maximum value of said counter has been reached and clearing in response to a clear signal received at its clear input terminal; and
- flip-flop means having an enabling terminal for receiving a fine control signal from said RAM controller as an enabling signal, an input terminal coupled to said carryover output terminal and an output terminal coupled to the clear input terminal of said transmit burst symbol counter, whereby said flip-flop is set in response to an enabling signal and reset in response to an input signal.

26. A microprogrammable TDMA terminal controller as defined in claims 1 or 16, wherein the control signals provided by said RAM controller include fine control signals, said receive means comprising:
- means for receiving data from said demodulated receive burst;
- means for receiving a receive clock signal synchronized to said receive burst;
- receive burst symbol counting means continuously incrementing in response to said receive clock signals;
- a receive programmable read only memory (PROM) for providing receive burst timing control signals in response to an address input, said receive PROM receiving its address input from the output of said receive burst symbol counting means; and
- preamble means responsive to control signals from said computer means and to timing control signals from said receive PROM for deriving preamble information from said data.

27. A microprogrammable TDMA terminal controller as defined in claim 26, wherein said preamble means includes a descrambler for descrambling the demodulated data received from said modem.

28. A microprogrammable TDMA terminal controller as defined in claim 26, wherein said preamble means includes receive common signalling channel (CSC) means for deriving CSC information from said demodulated data.

29. A microprogrammable TDMA terminal controller as defined in claim 26, wherein said preamble means includes receive order wire (OW) means for deriving OW information from said demodulated data.

30. A microprogrammable TDMA terminal controller as defined in claim 26, further comprising unique word detection means for detecting a unique word within the preamble of a demodulated receive burst.

31. A microprogrammable TDMA terminal controller as defined in claim 30, wherein said unique word detection means comprises:
- an aperture generator for generating an enabling signal of predetermined duration in response to an enabling signal, said aperture generator receiving a fine control signal as its enabling signal in response to coincidence between the output of said receive burst symbol counting means and a fine count control value from said control RAM; and
- a unique word detector enabled by the output from said aperture generator for generating a unique word detection signal in response to the detection of a unique word in the receive demodulated data.

32. A microprogrammable TDMA terminal controller as defined in claim 31, wherein said receive burst symbol counting means includes:
- a receive burst symbol counter continuously incrementing in response to received clock signals and providing an output value representing the contents of said counter, said counter further including a clear terminal for receiving a clear signal; and
- flip-flop means having its output coupled to the clear input terminal of said counter and its clock input coupled to the clock input terminal of said counter, said flip-flop means comprising a JK flip-flop and receiving the output from said unique word detector as its J input and the output from said aperture generator as its K input.

* * * * *

UNITED STATES PATENT AND TRADEMARK OFFICE
CERTIFICATE OF CORRECTION

PATENT NO. : 4,355,388

DATED : October 19, 1982

INVENTOR(S) : Joseph H. DEAL, Jr.

Page 1 of 2

It is certified that error appears in the above-identified patent and that said Letters Patent is hereby corrected as shown below:

IN THE SPECIFICATION:

Column 7, line 9, change "TAM" to --RAM--.

Column 9, line 45, change "while" to --whole--.

Column 10, line 40, change "of" to --at--.

Column 14, line 4, change "ca" to --can--.

Columns 21 and 22 under the subheading "TURN TX OFF", column 1, line 1, change "A91A" to --A19A--.

Colums 23 and 24 under the subheading "CLOSE UW AP", column 1, line 3, change "A2F4" to --A1F4--.

Columns 27 and 28 under the subheading "NORMAL COURSE COUNT DECREMENT", column 4, line 1, change "FIND" to --FINE--.

UNITED STATES PATENT AND TRADEMARK OFFICE
CERTIFICATE OF CORRECTION

PATENT NO. : 4,355,388

DATED : October 19, 1982

INVENTOR(S) : Joseph H. DEAL, JR.

It is certified that error appears in the above-identified patent and that said Letters Patent is hereby corrected as shown below:

IN THE SPECIFICATION:

Columns 27 and 28 under the subheading "MAIN PROGRAM LOAD RAM CONSTANTS SET RML TRAP INSTRUCTIONS", column 6, line 3, change "ADDRES" to --ADDRESS--.

Signed and Sealed this

Nineteenth Day of April 1983

[SEAL]

Attest:

GERALD J. MOSSINGHOFF

Attesting Officer    Commissioner of Patents and Trademarks